(12) United States Patent
Tillman et al.

(10) Patent No.: US 11,556,606 B1
(45) Date of Patent: *Jan. 17, 2023

(54) GRAPHICAL USER INTERFACES (GUIS) INCLUDING OUTGOING USPTO CORRESPONDENCE FOR USE IN PATENT CASE MANAGEMENT AND DOCKETING

(71) Applicant: NIMVIA, LLC, Charlotte, NC (US)

(72) Inventors: Chad Dustin Tillman, Matthews, NC (US); Jeremy Cooper Doerre, Charlotte, NC (US)

(73) Assignee: NIMVIA, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/172,039

(22) Filed: Feb. 9, 2021

Related U.S. Application Data

(63) Continuation-in-part of application No. 16/706,858, filed on Dec. 9, 2019, now Pat. No. 11,100,185, (Continued)

(51) Int. Cl.
*G06F 16/954* (2019.01)
*G06Q 50/18* (2012.01)
(Continued)

(52) U.S. Cl.
CPC ......... *G06F 16/954* (2019.01); *G06Q 50/184* (2013.01); *H04L 63/0823* (2013.01); *G06F 16/83* (2019.01)

(58) Field of Classification Search
CPC ..... G06F 16/954; G06F 16/83; G06Q 50/184; H04L 63/0823
See application file for complete search history.

(56) References Cited

U.S. PATENT DOCUMENTS 6,789,092 B1    9/2004   Oppedahl et al.
7,346,518 B1 *   3/2008   Frank ............... G06Q 99/00
                                                                705/310

(Continued)

FOREIGN PATENT DOCUMENTS

WO    WO-2015017846 A1 *   2/2015 ........... G06F 3/0486

OTHER PUBLICATIONS

Oppendahl, Carl, : Getting Signed Up for Access to the Patent Office Status of Your Pending US Patent Applications, Feb. 2000.

(Continued)

*Primary Examiner* — Kevin D Mew
(74) *Attorney, Agent, or Firm* — Tillman Wright, PLLC; Chad D. Tillman

(57) ABSTRACT

Methods, systems and software include programmatically downloading over the Internet, at routine intervals of time as well as on demand, from an online computer system of the USPTO, data relating to patent properties that are associated with a customer number; and creating a docket based on the downloaded data, generating and displaying a report generated from the downloaded data, sending an alert (email or text message) that is based on the downloaded data, or any combination thereof. Outgoing correspondence of the USPTO is provided in PDF format for review by a user. Data specific to a particular client also is provided to the client programmatically, with reports, alerts, docketing, or any combination thereof, further being provided for use by the client.

20 Claims, 30 Drawing Sheets

Related U.S. Application Data which is a continuation of application No. 15/709,089, filed on Sep. 19, 2017, now Pat. No. 10,503,801, which is a continuation-in-part of application No. 14/574,074, filed on Dec. 17, 2014, now abandoned.

(60) Provisional application No. 62/972,031, filed on Feb. 9, 2020, provisional application No. 62/396,756, filed on Sep. 19, 2016, provisional application No. 61/917,344, filed on Dec. 17, 2013.

(51) Int. Cl.
  *H04L 9/40* (2022.01)
  *G06F 16/83* (2019.01)

(56) References Cited

U.S. PATENT DOCUMENTS

| | | | |
|---|---|---|---|
| 7,386,460 B1 | 6/2008 | Frank et al. | |
| 7,634,415 B2 | 12/2009 | Baker | |
| 7,712,111 B2 | 5/2010 | Illowsky et al. | |
| 7,895,104 B1 | 2/2011 | Lee et al. | |
| 8,078,545 B1 | 12/2011 | Zilka et al. | |
| 8,661,242 B1 | 2/2014 | Gershman et al. | |
| 8,661,245 B1* | 2/2014 | Doerre | G06Q 10/10 709/228 |
| 8,966,242 B1* | 2/2015 | Doerre | G06Q 10/10 705/310 |
| 9,092,545 B2* | 7/2015 | Rivette | G06Q 10/10 |
| 9,544,302 B1 | 1/2017 | Doerre et al. | |
| 9,906,515 B1 | 2/2018 | Tillman et al. | |
| 10,503,801 B1 | 12/2019 | Tillman et al. | |
| 10,832,362 B1 | 11/2020 | Tillman et al. | |
| 11,100,185 B1 | 8/2021 | Tillman et al. | |
| 2002/0024540 A1 | 2/2002 | McCarthy | |
| 2002/0161733 A1* | 10/2002 | Grainger | G06Q 50/184 706/45 |
| 2004/0073443 A1 | 4/2004 | Gabrick et al. | |
| 2005/0210009 A1* | 9/2005 | Tran | G06Q 10/103 |
| 2006/0080136 A1* | 4/2006 | Frank | G06Q 10/06313 705/310 |
| 2006/0095377 A1* | 5/2006 | Young | H04L 63/10 705/50 |
| 2006/0190275 A1 | 8/2006 | Dupree et al. | |
| 2007/0078886 A1 | 4/2007 | Rivette | |
| 2007/0203737 A1 | 8/2007 | Boozer | |
| 2009/0063427 A1 | 3/2009 | Zuta et al. | |
| 2009/0271425 A1* | 10/2009 | Le Gall | G06F 16/84 707/E17.127 |
| 2011/0060910 A1* | 3/2011 | Gormish | H04L 9/3247 713/176 |
| 2011/0191310 A1 | 8/2011 | Liao et al. | |
| 2012/0191502 A1 | 7/2012 | Gross et al. | |
| 2013/0198092 A1* | 8/2013 | Dugan | G06Q 99/00 705/310 |
| 2013/0317994 A1* | 11/2013 | Tran | G06Q 50/184 705/310 |
| 2014/0365386 A1 | 12/2014 | Carstens et al. | |
| 2016/0048936 A1* | 2/2016 | Perkowski | G06Q 10/063 705/310 |
| 2017/0235848 A1 | 8/2017 | Van Dusen | |
| 2021/0279829 A1 | 9/2021 | Tillman et al. | |

OTHER PUBLICATIONS

Macro-Expert, "Press Room". Apr. 29, 2008 and earlier, http://www.macro-expert.com/solutions/indes.html. 11 pages.

Mahesh Chand, Building Reports for XML Documents using ReportViewer, Apr. 19, 2007, http://www.o-sharpcorner.com/UploadFile/maheshXmlReports04182007115639aM/XmlReports.aspx, 5 pages.

Private Pair 7.1 "Quick Start Guide", Aug. 2007, pp. 1-4 http://www.uspto.gov/patents/process/status/private_pair/xmldownload-v2_09_07_07.pdf.

Reichel, Mark, So . . . What Does it All Really Mean, Sep. 17, 2008, http://dailydoseofip.blogspot.com/2008/09/so-what-does-it-all-really-mean.html, 2 pages.

USPTO, PCT Search, Aug. 2007, http://www.uspto.gov/patents/process/status/private_pair/pctsearch-v2_09_07_07.pdf. 5 pages.

USPTO, Private PAIR, Sep. 22, 2008 or earlier, http://www.uspto.gov/patents/process/status/private_pair/index.jsp, 3 pages.

USPTO, XML Download, Aug. 2007, http://www.uspto.gov/patents/process/status/private_pair/xmldownload-v2_09_07_07.pdf, 11 pages.

Veign, Create a one-time popup using jQuery. www.veign.com/blog/2005/05/22/create-a-one-time-popup-usingjquery, May 22, 2008.

\* cited by examiner

GRAPHICAL USER INTERFACES (GUIS) INCLUDING OUTGOING USPTO CORRESPONDENCE FOR USE IN PATENT CASE MANAGEMENT AND DOCKETING

CROSS-REFERENCE TO RELATED APPLICATION

The present application hereby incorporates by reference: U.S. patent application Ser. No. 16/706,858, filed 2019 Dec. 9; U.S. patent application Ser. No. 15/709,089, filed 2017 Sep. 19, now U.S. Pat. No. 10,503,801; U.S. patent application Ser. No. 14/574,074, filed 2014 Dec. 17; U.S. patent application Ser. No. 13/082,374, filed 2011 Apr. 7; U.S. patent application Ser. No. 12/891,785, filed 2010 Sep. 27; and U.S. patent application No. 61/246,083, filed 2009 Sep. 25. Any U.S. application publication thereof, any patent issuing from the foregoing including the '801 patent, and any appendices and computer program listings thereof are incorporated by reference herein.

The present application relates to case management and docketing apparatus, systems, and methods utilizing the computer systems and services provided by the U.S. Patent & Trademark Office currently under the Private PAIR branding, and hereby incorporates the disclosures—including the computer program listings and associated source code—of the patent applications of the foregoing paragraph. A portion of this incorporated disclosure is set forth below in the written description and in the drawings for ease of reference.

The present application further extends such disclosures by the further advancements and innovations disclosed herein that have been made since the filings of these earlier incorporated patent applications. In this respect, the present application extends the disclosures of these applications by inclusion of the following computer program listing, itself comprising source code for a program titled "Searchlight 2019" representing improvements in the apparatus, systems, and methods disclosed in these earlier-filed patent applications. The most recent version of the program titled 20200207 was publicly released on Jan. 18, 2020, and the other titled 20191101 was publicly released on Nov. 1, 2019. Both versions include a graphical user interface that presents outgoing USPTO correspondence, as seen in FIG. 14.

Additionally, version 20191101 utilizes not only data for patent applications and patents that are associated with a user's "MyUspto" account, but data for patent applications and patents that are not associated with a user's "MyUspto" account. Such association is accomplished through associating a user with one or more customer numbers, and associating patent application and patents with such customer numbers.

The USPTO discontinued access to data for patent applications and patents through Private PAIR on or around Nov. 16, 2019. Accordingly, version 20200207 utilizes not only data for patent applications and patents that are associated with a user's "MyUspto" account and currently accessible through Private PAIR. Data for patent applications and patents that is not associated with a user's "MyUspto" account is still available through, e.g., Public PAIR, and version 20191101 is still representative of preferred ways of advantageously utilizing such data.

COPYRIGHT STATEMENT

All of the material in this patent document, including the computer program listing, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

Computer Program Listing

Submitted concurrently herewith via the USPTO's electronic filing system, and incorporated herein by reference, are computer program files including instructions, routines, and/or other contents of several computer program. A table setting forth the name and size of each file included in the computer program listing is included below.

| File Name | Creation Date | Size (Bytes) | Description |
| --- | --- | --- | --- |
| nimvia.txt | Dec. 17, 2013 20:20 | 21387117 | Visual Studio 2012 Solution |
| ascify.txt | Sep. 19, 2017 12:04 | 37473 | Assembly Source Code |
| readme.txt | Sep. 19, 2017 12:04 | 2923 | Instructions |
| cpl1.txt | Sep. 19, 2017 11:56 | 22478505 | Visual Studio 2015 Solution |
| cpl2.txt | Sep. 19, 2017 11:56 | 22478162 | Visual Studio 2015 Solution |
| cpl3.txt | Sep. 19, 2017 11:57 | 22477819 | Visual Studio 2015 Solution |
| cpl4.txt | Sep. 19, 2017 12:03 | 22477476 | Visual Studio 2015 Solution |
| cpl5.txt | Sep. 19, 2017 12:03 | 22477133 | Visual Studio 2015 Solution |
| cpl6.txt | Sep. 19, 2017 12:04 | 22476790 | Visual Studio 2015 Solution |
| cpl7.txt | Sep. 19, 2017 12:04 | 15753119 | Visual Studio 2015 Solution |
| readme2020.txt | Feb. 7, 2020 14:28 | 2,710 | Additional Instructions |
| 20191101.txt | Feb. 8, 2020 01:00 | 810,439 | C# Source Code Files |
| 20200207.txt | Feb. 8, 2020 01:00 | 796,508 | C# Source Code Files |

The file "readme.txt", contains instructions for utilizing "ascify.txt" to extract information from the other files. The other files represent some or all of a compressed binary file that has been converted to ascii format. These other files can be converted back to binary format utilizing an assembly conversion program source code which is contained in "ascify.txt". The readme file includes instructions for compiling and running this conversion program, as well as instructions for converting the other files to compressed, binary files.

The "nimvia" text file corresponds to a compressed, binary file that represents a compressed zip file containing source code written in C #using Visual Studio 2012. The target environment for implementations utilizing such source code is 32-bit or 64-bit Windows XP, Vista, or 7.

This "cpl" text files correspond to a compressed, binary file which includes source code written in C#. In particular, this compressed, binary file includes six different file packages contained therein. Three of these are .zip files, while the other three are .tar.gz files. These files can be opened utilizing a decompression utility such as 7Zip. These packages include code for various versions of software implementing features in accordance with one or more preferred embodiments.

The .tar.gz packages represent software components designed to function together. The .zip packages represent updated versions of the components contained in the .tar.gz packages, although these updated versions may not be fully integrated with one another. It will be appreciated, however, that improvements disclosed in this code can be utilized together.

Regarding the titled "readme2020.txt", this file contains instructions for extracting information from text files "20191101.txt" and "20200207.txt", each of which represents a compressed binary file that has been converted to ascii format. This file can be converted back to a compressed .zip archive utilizing an assembly conversion program source code for which is contained in "ascify.txt". The readme file includes instructions for compiling and running this conversion program, and instructions for converting the other text files to a compressed, binary file. Each of These compressed, binary files titled "20191101.txt" and "20200207.txt" includes C #source code for a version of a computer program embodying aspects and features in accordance with one or more preferred embodiments

BACKGROUND OF THE INVENTION

The present invention generally relates to patent case management and docketing.

There exist many systems and methods for managing intellectual property data. For example, USPA Pub. No. 2005/0210009 to Tran discloses systems and methods for providing an electronic file for intellectual property applications by receiving electronic file wrapper information from a patent office; and generating a single electronic document for an entry in the electronic file wrapper information, the document having all images for the entry consolidated therein.

The current state-of-the-art for patent case management and docketing fails to realize the full potential of Private PAIR and the XML data that is made available by the U.S. Patent & Trademark Office (USPTO) to patent practitioners for download.

Current practices primarily rely on the physical docketing of USPTO correspondence that is received by practitioners via the U.S. Post Office. Typically, one or more docket clerks open and review the USPTO correspondence, and then make manual data entries in a docket program for creating and tracking deadlines that may be associated with the USPTO correspondence. Sometimes this function is outsourced to a third party service provider.

At single-practitioner firms and some smaller firms, the manual data entry may be performed by the practitioner himself or herself. Moreover, the data may not even be entered into a docketing program, but instead in a general purpose calendar program or spreadsheet that is not specifically designed to address any particular patent case management and patent docketing needs.

The manual data entry that is performed in these conventional practices is generally duplicative of the data entry that has already been performed by the USPTO. In this regard, application data, including USPTO correspondence data, is already maintained in electronic form by the USPTO and access to this data, via XML file downloads, is provided to patent practitioners by the USPTO in Private PAIR.

Accordingly, a need exists for improvement in patent case management and docketing and, specifically, a need exists for making use of the XML data that is provided by the USPTO to patent practitioners in patent case management and docketing, whether through Private PAIR or other online systems of the USPTO. This, and other needs, are addressed by one or more embodiments of the invention.

SUMMARY OF THE INVENTION

The present invention includes many aspects and features. Moreover, while many aspects and features relate to, and are described in, the context of patent case management and docketing based on data downloaded from the USPTO, the present invention is not limited to use only in connection with the USPTO, and it is contemplated that broad aspects of the invention encompass uses in connection with data that may be available for download from other patent offices, including the European Patent Office.

A first aspect relates to a computer-implemented method for presenting a graphical user interface (GUI) at a personal computer providing access to information from an instance of an in-memory docket that is generated on demand by a user without manual data entry of bibliographical or transactional information of patent properties, the instance of the in-memory docket comprising information regarding patent properties that are associated with a customer number at the U.S. Patent & Trademark Office. The method includes programmatically downloading, by the personal computer, from an online computer system of the United States Patent & Trademark Office, data relating to patent properties that are associated with the customer number by programmatically accessing over the Internet the online computer system using a public key infrastructure digital certificate or other authentication mechanism, and programmatically downloading to the personal computer one or more XML files containing application data for a customer number; programmatically constructing in transitory memory of the personal computer, based on the downloaded data, the in-memory docket for the patent properties associated with the customer number; and programmatically displaying the graphical user interface providing access to information from the instance of an in-memory docket, the graphical user interface comprising a matters display area configured to display a row for each patent property representing a matter in the in-memory docket, the in-memory docket including a matter for each patent property associated with the customer number, wherein a user can click on a row to select it, a matter details display area configured to display details for a matter selected via the matters display area, and an events display area configured to display a plurality of rows each corresponding to an event for a matter selected via the matter display area.

In a feature of this aspect, the events configured to be displayed in the events display area include events based on transaction information for a patent property.

In a feature of this aspect, the events configured to be displayed in the events display area include events based on status information for a patent property.

In a feature of this aspect, the events configured to be displayed in the events display area include events based on mail information for a patent property.

In a feature of this aspect, the events configured to be displayed in the events display area include events based on image file wrapper information for a patent property.

In a feature of this aspect, the events display area comprises a search box configured search for events matching a search query.

In a feature of this aspect, the events display area comprises a filter row configured to filter the events displayed in the events display area.

In a feature of this aspect, the graphical user interface further comprises a search box configured to allow a user to search for matters matching a search query.

In a feature of this aspect, the matters display area further comprises a filter row configured to filter the matters displayed in the matters display area.

In a feature of this aspect, the matters display area is scrollable.

In a feature of this aspect, the events display area is scrollable.

In a feature of this aspect, the matters display area is displayed on a left side of the graphical user interface.

In a feature of this aspect, the matters display area is displayed on a left side of the graphical user interface, and the matter details display area and the events display area are displayed on a right side of the graphical user interface.

In a feature of this aspect, the matters display area is displayed on a left side of the graphical user interface, the matter details display area and the events display area are displayed on a right side of the graphical user interface, and the matter details display area is displayed above the events display area.

Another aspect relates to a computer-implemented method for presenting a graphical user interface (GUI) at a personal computer providing access to information from an instance of an in-memory docket that is generated on demand by a user without manual data entry of bibliographical or transactional information of patent properties, the instance of the in-memory docket comprising information regarding patent properties that are associated with a customer number at the U.S. Patent & Trademark Office. The method includes programmatically downloading, by the personal computer, from an online computer system of the United States Patent & Trademark Office, data relating to patent properties that are associated with the customer number by programmatically accessing over the Internet the online computer system using a Public key Infrastructure digital certificate, and programmatically downloading to the personal computer one or more XML files containing application data for a customer number; programmatically constructing in transitory memory of the personal computer, based on the downloaded data, the in-memory docket for the patent properties associated with the customer number; and programmatically displaying, to a user via an electronic display of the personal computer, the graphical user interface providing access to information from the instance of an in-memory docket, the graphical user interface comprising a matters display area including a row for each patent property representing a matter in the in-memory docket, the in-memory docket including a matter for each patent property associated with the customer number, wherein a user can click on a row to select it, a matter details display area including details for a matter selected via the matters display area, and an events display area including a plurality of rows each corresponding to an event for a matter selected via the matter display area.

In accordance with an aspect of the invention, a system comprises a data engine configured to download data from a USPTO web platform; an update module configured to access data downloaded by the data engine, process it to produce information regarding patent properties, and post the produced information to a repository; and a user interface module configured to access produced information from the repository and presents a user interface to a user which presents various views of the information.

In accordance with an aspect of the invention, a method comprises downloading, by a data engine, data from a USPTO web platform; accessing, by an update module, data downloaded by the data engine, processing it to produce information regarding patent properties, and posting the produced information to a repository; and accessing, by a user interface module, the produced information from the repository and presenting a user interface to a user which presents various views of the information.

In accordance with an aspect of the invention, a computer-readable medium contains computer-executable instructions that, when executed by a computer, perform a method comprising the steps of: downloading, from an online computer system of the USPTO, data relating to patent properties that are associated with a customer number; and creating a docket based on the downloaded data.

In a feature, the method is performed on a computer of a patent practitioner or a law firm.

In a feature, the data that is downloaded is saved to local storage for later access.

In a feature, the data that is downloaded is saved to cloud storage for later access.

In a feature, the method further performs a step of determining whether data has been previously downloaded for the day and no download is performed if data has already been downloaded. The method may perform the step of downloading the data from a cloud server if the determination is made that data has been previously been downloaded for the day.

In a feature, the method further comprises accessing the online computer system of the USPTO using a PKI digital certificate, and downloading an XML file containing application data for each customer number. Each of the steps of the method are programmatically performed, and may be performed on a routine basis automatically without manual input from a user. Steps (a) and (b) further may be performed on demand by a user under the direction and control of a patent practitioner. Furthermore, each of the steps (a) and (b) may be are performed after expiration of a predetermined period of time; and each of the steps (a) and (b) may be programmatically performed at a particular time of day or within a particular window of time on one or more predetermined days.

In a feature, following step (a), the data that is downloaded is processed.

In a feature, following step (a), the data that is downloaded is consolidated into an initial dataset, and the method further comprises: saving modifications to the initial dataset separately from the initial dataset, whereby the initial dataset itself is unchanged; and constructing a working dataset by applying saved modifications to the initial dataset. The saved modifications may be modifications made by a docket clerk, by a patent practitioner, or both in which case the modifications made by the docket clerk are applied before the modifications made by the patent practitioner are applied. The method further may comprise the steps of creating a dataset comprising data for a particular client of the patent practitioner, and saving the client dataset to a cloud location for later access by the client. Of course as will be understood by the Ordinary Artisan, a dataset represents an in-memory cache of data retrieved from a data source and may be organized in memory within rows of data tables or may be organized within instances of a class object in an object-oriented programming language, or combinations thereof.

In accordance with an aspect of the invention, a method comprises the steps of: (a) downloading, from an online computer system of the USPTO, data relating to patent properties that are associated with a customer number; and (b) creating a docket based on the downloaded data; (c) wherein said steps (a) and (b) are performed programmatically by a program that is executed on a computer.

In accordance with an aspect of the invention, a system comprises: (a) a computer connected to the Internet; and (b) a program run by the computer; (c) wherein the computer, in accordance with the program being run, (i) programmatically downloads at routine intervals of time, from an online computer system of the USPTO, data relating to patent properties that are associated with a customer number; and (ii) creates a docket based on the downloaded data.

In accordance with an aspect of the invention, a computer-readable medium contains computer-executable instructions that, when executed by a computer, perform a method comprising the steps of: (a) downloading, from an online computer system of the USPTO, data relating to patent properties that are associated with a customer number; and (b) generating and displays a report based on the downloaded data.

In a feature, following step (a), the data that is downloaded is consolidated into an initial dataset from which the report is generated. The method further may include saving modifications to the initial dataset separately from the initial data set, and constructing a working dataset by applying saved modifications to the initial dataset whereby the initial dataset itself is unchanged, in which case the report that is generated includes the modifications.

In another aspect, a method comprises the steps of: (a) downloading, from an online computer system of the USPTO, data relating to patent properties that are associated with a customer number; and (b) generating and displays a report based on the downloaded data; (c) wherein said steps (a) and (b) are performed programmatically by a program that is executed on a computer.

In another aspect, a system comprises: (a) a computer connected to the Internet; and (b) a program run by the computer; (c) wherein the computer, in accordance with the program being run, (i) programmatically downloads at routine intervals of time, from an online computer system of the USPTO, data relating to patent properties that are associated with a customer number; and (ii) generating and displays a report based on the downloaded data.

In another aspect, a computer-readable medium contains computer-executable instructions that, when executed by a computer, perform a method comprising the steps of: (a) downloading, from an online computer system of the USPTO, data relating to patent properties that are associated with a customer number; and (b) sending an email alert based on the downloaded data.

In a feature, following step (a), the data that is downloaded is consolidated into an initial dataset on which the email alert is based. The method further may include saving modifications to the initial dataset separately from the initial data set, and constructing a working dataset by applying saved modifications to the initial dataset whereby the initial dataset itself is unchanged, in which case the email alert is based on the initial dataset including the modifications applied thereto.

In accordance with an aspect of the invention, a method comprises the steps of: (a) downloading, from an online computer system of the USPTO, data relating to patent properties that are associated with a customer number; and (b) sending an email alert based on the downloaded data; (c) wherein said steps (a) and (b) are performed programmatically by a program that is executed on a computer.

In accordance with an aspect of the invention, a system comprises: (a) a computer connected to the Internet; and (b) a program run by the computer; (c) wherein the computer, in accordance with the program being run, (i) programmatically downloads at routine intervals of time, from an online computer system of the USPTO, data relating to patent properties that are associated with a customer number; and (ii) sends an email alert based on the downloaded data when a precondition is met.

In a feature, the precondition comprises any new updates to status or transaction information for at least one of the patent properties for which data is downloaded.

In a feature, the email alert includes a report listing the updates.

In another aspect, a computer-readable medium contains computer-executable instructions that, when executed by a computer, perform a method comprising the steps of: (a) downloading, from an online computer system of the USPTO, data relating to patent properties that are associated with a customer number; and (b) sending a text message to a mobile phone based on the downloaded data.

In another aspect, a computer-readable medium contains computer-executable instructions that, when executed by a computer, perform a method comprising the steps of: (a) downloading, from a first cloud, first patent data relating to patent properties of a person or legal entity that are associated with a first customer number; (b) downloading, from a second cloud, second patent data relating to patent properties of the same person or legal entity that are associated with a second customer number; and (c) generating and displaying a consolidated report to the person or legal entity based on the first patent data and second patent data.

In a feature, the first cloud and the second cloud are the same. Alternatively, the first cloud and the second cloud are different.

In a feature of this aspect, the first customer number is associated with a first law firm and the second customer number is associated with a second, different law firm, and the first patent data and the second patent data both contain data on patent properties that are assigned to or under obligation of assignment to the person or entity.

In a feature, step (a) includes downloading the first patent data to a computer of the person or entity, step (b) includes downloading the second patent data to the same computer of the person or entity, and the consolidated report is generated and displayed on a display connected to the computer of the person or entity.

Preferably, the computer-readable medium of the foregoing aspects that contains computer-executable instructions is non-transitory.

In another aspect, a non-transitory computer-readable medium contains computer-executable instructions that, when executed by a personal computer of a patent practitioner, perform a method on the personal computer comprising the steps of: (a) programmatically downloading to the personal computer of the patent practitioner, using a web browser running on the personal computer of the patent practitioner, from an online computer system of the United States Patent & Trademark Office, data relating to patent properties that are associated with at least one customer number by (i) programmatically accessing over the Internet, with the web browser running on the personal computer of the patent practitioner, the online computer system using a Public key Infrastructure digital certificate, and (ii) programmatically downloading to the personal computer, through the access to the online computer system gained with the web browser running on the personal computer of the patent practitioner using the Public key Infrastructure digital certificate, one or more XML files containing application data for at least one customer number; (b) programmatically creating, based on the downloaded data, in transitory memory of the personal computer, an in-memory docket for the patent properties associated with the at least one customer number; and (c) programmatically displaying, through a graphical user interface at the personal computer, data of the in-memory docket for review by a user using the personal computer, including displaying bibliographical and transactional information of at least one of the patent properties for which data was downloaded. The steps result in an instance of an in-memory docket for the patent properties that are associated with the at least one customer number being programmatically created in the memory of the personal computer, based on the XML files downloaded to the personal computer of the patent practitioner from the online computer system of the United States Patent & Trademark Office, without manual data entry into the in-memory docket by the user of bibliographical or transactional information of the patent properties.

In a feature, each of the steps of the method are programmatically performed on a routine basis automatically without manual input from a user.

In a feature, each of the steps (a) and (b) are programmatically performed after expiration of a predetermined period of time.

In a feature, each of the steps (a) and (b) are programmatically performed at a particular time of day or within a particular window of time on one or more predetermined days.

In a feature, the performed method further comprises calculating deadline reminders for the patent properties based on the downloaded data for the patent properties and displaying the deadline reminders through the graphical user interface for review by a user.

In a feature, the performed method further includes enabling user modifications to the data of the in-memory docket through the graphical user interface.

In a feature, the performed method further comprises identifying user modifications that have been made to an instance of an in-memory docket, and applying the identified user modifications to another instance of an in-memory docket.

In a feature, the performed method further comprises identifying user modifications that have been made to an instance of an in-memory docket, and uploading the identified user modifications to cloud storage for later download to another personal computer having an instance of a docket to which the user modifications are applicable.

In a feature, the performed method further comprises downloading user modifications that have been made to an instance of an in-memory docket, and applying the downloaded user modifications to another instance of an in-memory docket.

In a feature, the downloaded user modifications are user modifications performed by a docket clerk, and wherein the personal computer on which the user modifications are applied is a personal computer of a patent practitioner.

In a feature, the performed method further comprises writing, programmatically from transitory memory of the personal computer, the data of the in-memory docket to a non-transitory computer-readable medium such that the data of the in-memory docket can be read back into transitory memory of the personal computer after a reboot of the personal computer.

In another aspect, a non-transitory computer-readable medium contains computer-executable instructions that, when executed by a personal computer of a patent practitioner, perform a method comprising the steps of: (a) programmatically downloading to the personal computer of the patent practitioner, using a web browser running on the personal computer of the patent practitioner, from an online computer system of the United States Patent & Trademark Office, data relating to patent properties that are associated with a customer number by (i) programmatically accessing, with the web browser running on the personal computer of the patent practitioner, the online computer system using a Public key Infrastructure digital certificate, and (ii) programmatically downloading to the personal computer of the patent practitioner, through the access to the online computer system gained with the web browser running on the personal computer of the patent practitioner using the public key infrastructure digital certificate or other authentication mechanism, one or more XML files containing application data for a customer number; and (b) if a first in-memory docket exists at the personal computer, then programmatically updating the first in-memory docket at the personal computer based on the downloaded data for the patent properties associated with the customer number, else creating a first in-memory docket at the personal computer based on the downloaded data for the patent properties associated with the customer number; and thereafter (c) if a second in-memory docket exists at the personal computer, then programmatically identifying any user modifications in the second in-memory docket; and (d) programmatically creating a new second in-memory docket as a function of any identified user modifications and the first in-memory docket such that the second in-memory docket comprises the downloaded data as overwritten by any user modifications; (e) wherein the second in-memory docket represents a docket that is programmatically created from data downloaded from the online computer system of the United States Patent & Trademark Office as changed thereafter by any user modifications.

In another aspect, a method for presenting, on demand by a user without manual data entry of bibliographical or transactional information of patent properties, an instance of an in-memory docket on a personal computer of the user for patent properties that are associated with a customer number at the U.S. Patent & Trademark Office, comprises the steps of: (a) programmatically downloading to the personal computer of the user, using a web browser running on the personal computer of the user, from an online computer system of the United States Patent & Trademark Office, data relating to patent properties that are associated with a customer number by (i) programmatically accessing over the Internet, with the web browser running on the personal computer of the user, the online computer system using a Public key Infrastructure digital certificate, and (ii) programmatically downloading to the personal computer, through the access to the online computer system gained with the web browser running on the personal computer of the user using the Public key Infrastructure digital certificate, one or more XML files containing application data for a customer number; (b) programmatically constructing in transitory memory of the personal computer, based on the downloaded data, an in-memory docket for the patent properties associated with the customer number; and (c) programmatically displaying, through a graphical user interface at the personal computer, data of the in-memory docket for review by a user using the personal computer, including displaying bibliographical and transactional information of the patent properties.

In another aspect, a system in which multiple instances are separately created by different users of an in-memory docket for the same patent properties associated with a particular customer number at the U.S. Patent & Trademark Office, comprising a plurality of computers connected to the Internet, each personal computer corresponding to one of the users and comprising non-transitory computer readable medium containing computer-executable instructions that, when executed on the personal computer of the respective user, perform a method comprising the steps of: (a) programmatically downloading to the personal computer of the respective user, using a web browser running on the personal computer of the respective user, from an online computer system of the United States Patent & Trademark Office, data relating to patent properties that are associated with the particular customer number by accessing over the Internet, with the web browser running on the personal computer of the respective user, the online computer system using a Public key Infrastructure digital certificate, and downloading to the personal computer of the respective user, through the access to the online computer system gained with the web browser running on the personal computer of the respective user using the Public key Infrastructure digital certificate, one or more XML files containing application data for the particular customer number; (b) programmatically creating, based on the downloaded data, in transitory memory of the personal computer, an in-memory docket for the patent properties associated with the particular customer number; and (c) programmatically displaying, through a graphical user interface at the personal computer, data of the in-memory docket for review by a user using the personal computer, including displaying bibliographical and transactional information of the patent properties; wherein an independent instance of an in-memory docket for the patent properties that are associated with the particular customer number is programmatically created in the memory of each respective personal computer of each respective user, based on the XML files separately downloaded to the respective personal computers of the respective users from the online computer system of the United States Patent & Trademark Office, without manual data entry into the in-memory docket of bibliographical or transactional information of the patent properties.

In a feature, the performed method with respect to one or more of the personal computers further comprises calculating deadline reminders for the patent properties based on the downloaded data for the patent properties and displaying the deadline reminders through the graphical user interface for review by a user.

In a feature, the performed method with respect to one or more of the personal computers further includes enabling user modifications to the data of the in-memory docket through the graphical user interface. The performed method with respect to one or more of the personal computers may further comprise identifying user modifications that have been made to an instance of an in-memory docket, and applying the identified user modifications to another instance of an in-memory docket; identifying user modifications that have been made to an instance of an in-memory docket, and uploading the identified user modifications to cloud storage for later download to another of the personal computers; and downloading user modifications that have been made to an instance of an in-memory docket on another one of the personal computers, and applying the downloaded user modifications to another instance of an in-memory docket.

Additionally, optimizations and processes are included in the foregoing disclosed embodiments, aspects and features that are believed to minimize accessing the online computer system of the USPTO and/or facilitate efficient and synergistic case management and docketing.

In such respects, features of this aspect include, once data is downloaded from the USPTO either for a customer number, the data is uploaded to the server in association therewith for the benefit of others associated with the customer number. In addition to data associated with a particular customer number, for data that is publicly available, such data that is downloaded by a practitioner also may be uploaded to a server for use by others seeking the same data. These additional optimizations and processes preferably are programmatically performed without action by a user.

Additional aspects comprise improvements in the user interface, including functionality and associated layout of the user controls. For example, a docketing and case management system is provided having an "Excel" or spreadsheet feel to it for users, wherein all of the data is available in grid form with direct access to the underlying data without searching for and modifying individual records, as experienced current docketing systems. As another example, a tab control is provided in which a first tab represent a listing of cases; another tab represents a listing of events found in all of the cases, including all status, transaction, mail, and image file wrapper events, whereby cases can be 'looked up' and directly viewed based on an events listing; and another tab includes deadline reminders that are programmatically generated based on events.

A user interface also preferably is provided for adding, deleting, and modifying rule sets for generating reminders, with reminders being generated on user demand as well as programmatically with existing reminders being updated with revised deadlines, where appropriate and where such deadlines have not been marked reviewed or completed by the user. The arrangement of information and user controls is believed to be innovative over currently existing systems and is believed to provide a synergy and efficiently in case management and docketing that is not realized by conventional systems. Additional tabs may be provided for managing invention disclosures, email alerts, and subsets of the data that are published to clients through 'clouds' made accessible to clients respectively.

In additional features, the case listing includes a plurality of views, including a docket inventory listing, a reverse chronological transactions listing, a status listing, an examiner listing, a data download audit listing, a priority fields listing, an ownership listing, and a publications listing. The status, transactions, and examiners listing preferably is grouped by status, transaction date, and examiner name respectively. Moreover, as there may be a significant number of different events, each preferably is mapped to a predefined short list of transactions and status descriptions, or ignored outright if no mapping is provided, whereby an efficient and 'noiseless' listing of status and transactions may be provided.

In yet another feature of the foregoing aspects, a graphical user interface comprises outgoing correspondence of the USPTO that is provided in PDF format for review by a user.

Other aspects and features relate to innovative functionality disclosed in software including as a computer program listing.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals.

DETAILED DESCRIPTION

Figure 1:
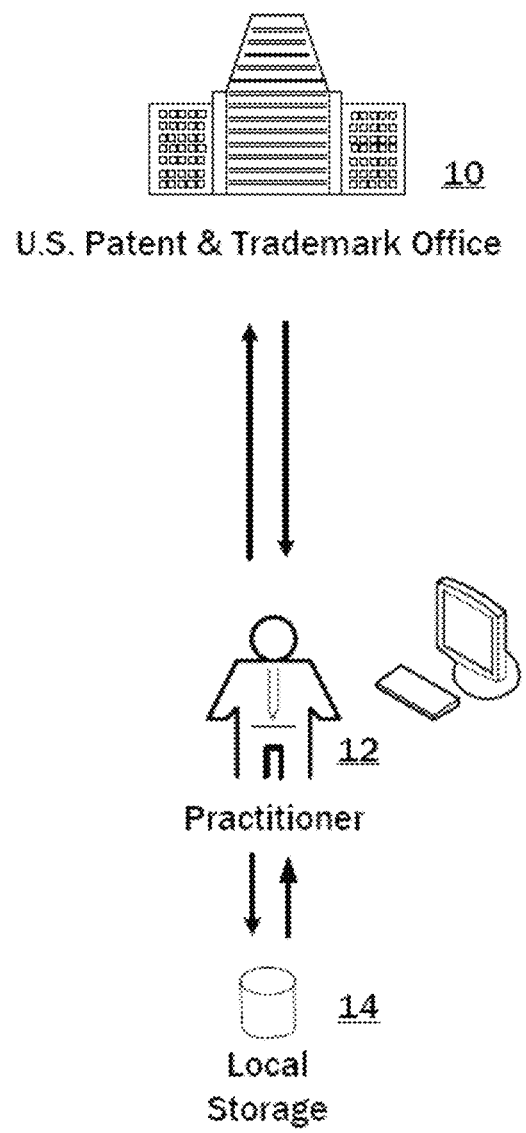
FIG. 1 is a schematic illustration of a system architecture in which information about patent properties is acquired electronically from the USPTO by a patent practitioner using a computer, which may include a desktop pc, laptop, or server of the practitioner, and then electronically saved to local data storage of the practitioner.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. 112(f), no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the invention are next described. The following description of one or more preferred embodiments is merely exemplary in nature and is in no way intended to limit the invention, its implementations, or uses.

Customer Numbers and PKI Digital Certificate/MyUspto Accounts

The U.S. Patent & Trademark Office (USPTO) maintains information about patent properties—including both patent applications and patents—in electronic form. Furthermore, the USPTO is now maintaining the official file records of current patent applications in electronic form.

In connection with this, the USPTO makes data regarding patent properties electronically accessible to the public via Public PAIR, and electronically accessible to patent practitioners via Private PAIR. Both Public PAIR and Private PAIR are available and widely accessible over the Internet. Moreover, the data that is now accessible to a particular patent practitioner via Private PAIR includes not only information that is available via Public PAIR, but also information about patent properties for which that patent practitioner is responsible and which is not yet publicly available. The USPTO used to accomplish this using customer numbers and PKI digital certificates; the USPTO now accomplishes this using customer numbers and individual "MyUspto" accounts, with individual practitioners each having such an account and being associated with customer numbers with which the accounts are associated by the USPTO.

In particular, a customer number is a five or six digital number that uniquely identifies: a person or legal entity; correspondence address for such entity; and a list of one or more patent practitioners, each practitioner being identified by his or her respective U.S. registration number. The USPTO electronically maintains the customer number information for each customer number.

The USPTO generally will issue a customer number in response to a request from a patent practitioner. A law firm is not limited to having a single customer number and may have more than one customer number. For instance, a law firm may request an additional customer number to be used in connection with all patent properties for a particular client of the law firm.

The customer number facilitates the identification of a correspondence address for patent properties as well as identification of those patent practitioners who can legally represent a patent applicant before the USPTO. Specifically, a customer number usually is identified in connection with the correspondence address for a patent property, and the customer number usually is identified in connection with a power of attorney in a patent property. Upon such identification in connection with the correspondence address, the USPTO thereafter associates the particular patent property with the identified customer number.

A PKI digital certificate used to be issued by the USPTO to a patent practitioner upon request, and the USPTO maintained an association between each PKI digital certificate and the patent practitioner to which the PKI digital certificate was issued. The PKI digital certificate was used to authenticate a patent practitioner to the USPTO when accessing Private PAIR over the Internet.

MyUspto accounts now are used for authentication as opposed to the PKI digital certificate. Nonetheless, once authenticated, access is provided to XML data for those patent applications and patents associated with customer numbers with which the practitioner's registration number is associated. Thus, the same associations between practitioners and applications are maintained even though an alternative authentication mechanism now is used.

Based on the associations maintained by the USPTO of: customer numbers with patent properties; patent practitioners with customer numbers; and PKI digital certificates/ MyUspto accounts with patent practitioners, patent practitioner generally are able to access information via Private PAIR for all patent properties associated with customer numbers that include that patent practitioner's registration number. Such access includes the ability to view information online about those patent properties as well as the ability to download XML files that include data about those patent properties. Moreover, the data is available for download on a customer number by customer number basis. Thus, for example, an XML file download is available for each customer number with which the patent practitioner is associated.

A First System Architecture

One or more preferred embodiments of the present invention are now described in connection with FIGS. 1-1b.

Figure 1A:
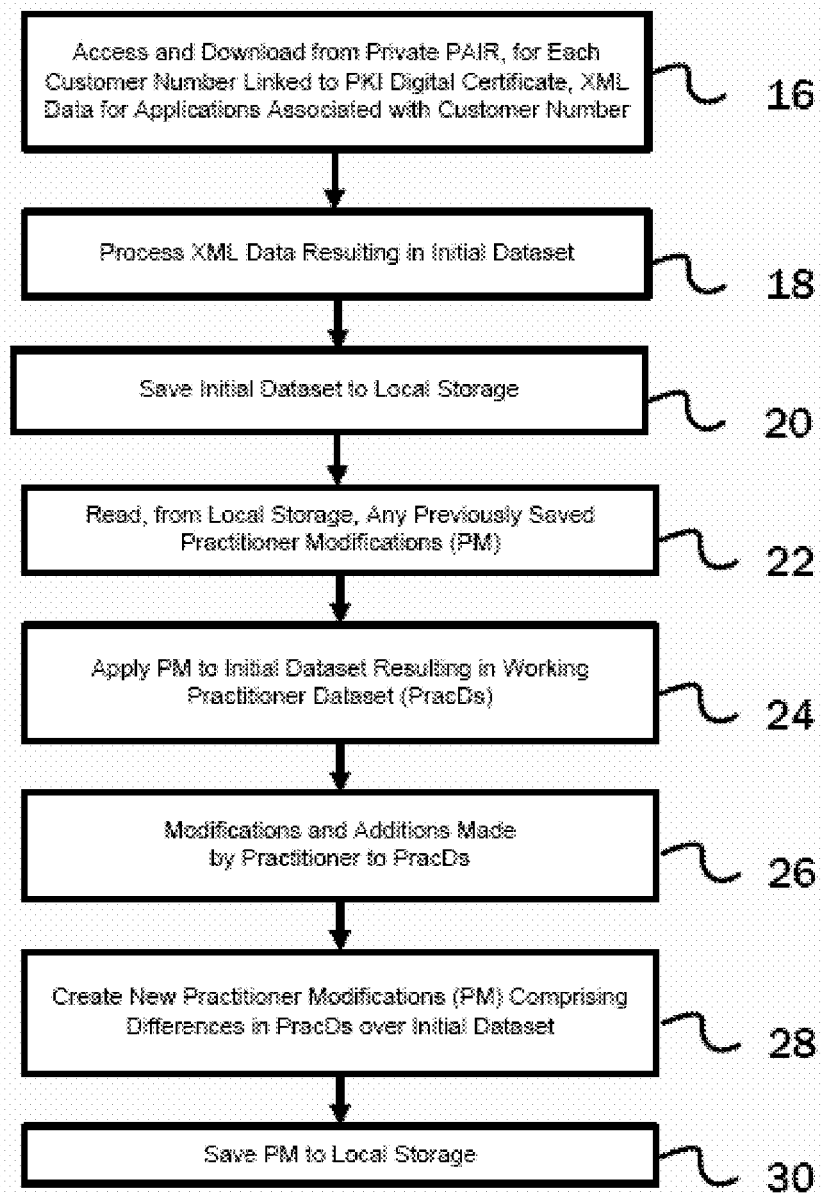
FIGS. 1A and 1B are flowcharts illustrating steps of one or more preferred embodiments in accordance with this first system architecture of FIG. 1.
Figure 1B:
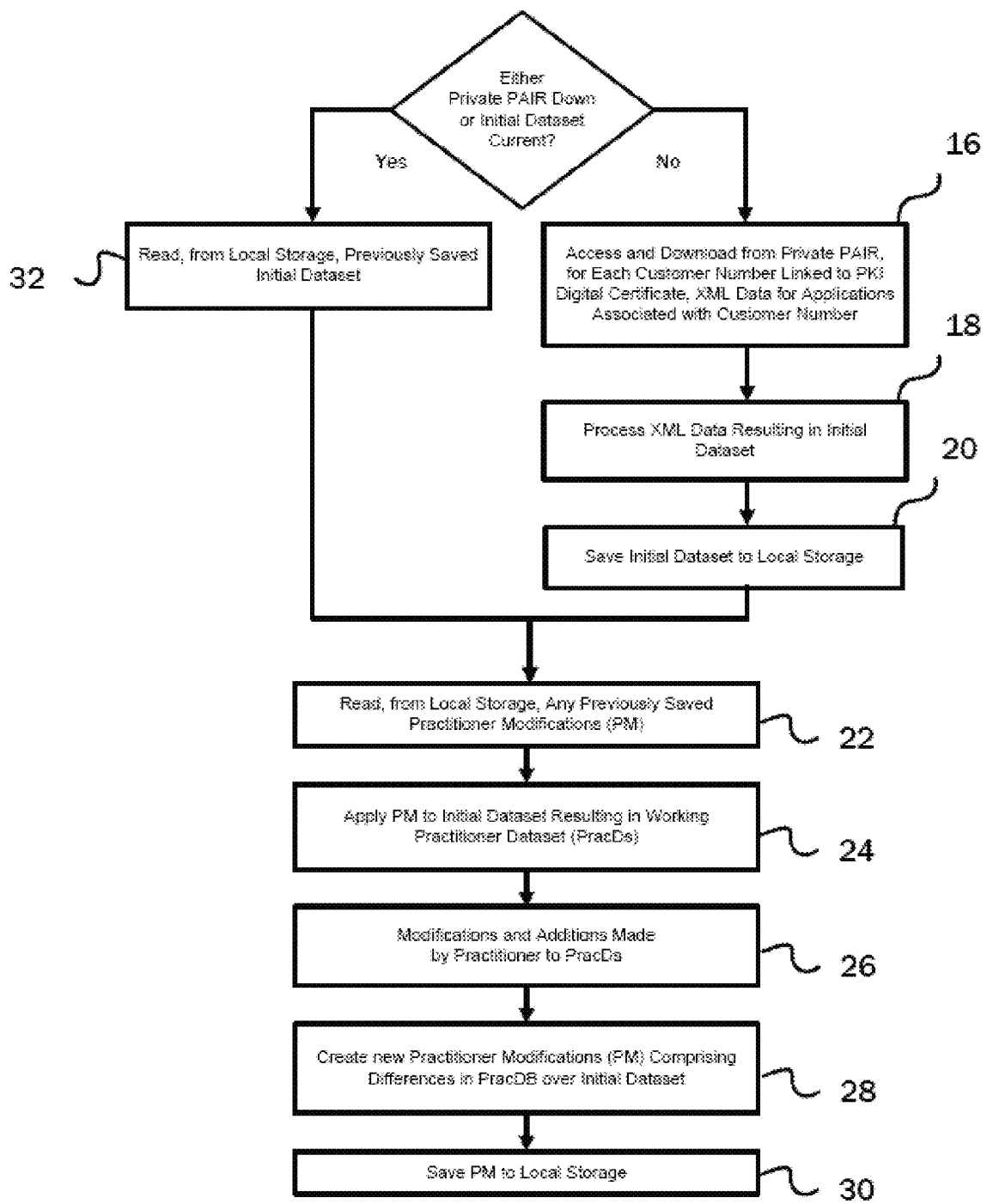

FIG. 1 is a schematic illustration of a system architecture in which information about patent properties is acquired electronically from the USPTO 10 by a patent practitioner 12 using a computer, which may include a desktop pc, laptop, or server of the practitioner, and then electronically saved to local data storage 14 of the practitioner. FIG. 1a is a flowchart illustrating steps of one or more preferred embodiments in accordance with this first system architecture.

Specifically, the patent practitioner accesses, via the Internet, Private PAIR and downloads 16 from the USPTO, for each customer number with which the patent practitioner is associated, the XML data for all of the patent properties associated with that customer number. Such data conventionally may be manually downloaded by navigating to the customer number filter in Private PAIR, selecting a desired customer number, and then selecting the orange "XML" button. However, in accordance with preferred embodiments, the downloading is programmatically performed on demand, automatically at a scheduled time, or automatically after a predetermined period of time has elapsed.

Optionally, detailed XML data may be separately downloaded for each of one or more specific patent properties for purposes of supplementing the information about such patent property that is contained in the customer number download. Such a download includes detailed information that is not included in the general customer number download, such as a history of transactions and outgoing correspondence for the specific patent property, and title and continuity information of the specific patent property. This information can be important, for example, in better calculating deadlines when docketing. The detailed XML data conventionally may be manually downloaded by navigating to the Application Data tab for the particular patent property in Private PAIR and then selecting the orange "XML" button. However, in accordance with one or more preferred embodiments, the downloading is programmatically performed when certain conditions are met that indicate such detailed information is needed.

Once the download customer number XML data is complete, the XML data from the downloaded files is processed 18 resulting in an initial dataset comprising a plurality of data tables. During the processing, the data from each of the downloaded XML files is reformatted and consolidated together. The data tables include an Application Data Table in which primary information about patent properties is stored; a Status and Transaction Data Table in which status and transaction data is stored; and a Correspondence Data Table in which outgoing correspondence information sent by the USPTO in connection with the patent properties is stored. The initial dataset is in the form of an in-memory dataset and is saved as one or more XML files. The initial dataset is saved 20 to local storage, such as on a hard disk drive, flash drive, or other local storage.

It will be appreciated that, rather than use in-memory datasets, one or more databases may be used. For example, objects may be used instead of data tables, and the objects may be stored, accessed, and manipulated using a database management system such as DB4O.

Also during processing, additional data may be derived from the data that has been downloaded from the USPTO and saved, including deadlines that may be calculated from the downloaded data. The derived data may be included in one or more data tables of the initial dataset. For instance, reminders regarding deadlines can be derived from the downloaded data and then saved in a reminders data table of the initial dataset.

Provided there are no previous modifications or additions by the practitioner that need to be accounted for (thus permitting steps 22 and 24 to be skipped in FIG. 1a), the initial dataset is used to generate and display reports to the patent practitioner; to generate and send alerts and reports via email to the patent practitioner, or other desired recipients; and to instantiate a docket of the patent practitioner. Additionally, the data may be filtered when generating reports, alerts or instantiating a docket so that only those patent properties of particular interest are included. Alternatively, such filtering may be performed when the initial dataset is created.

On the other hand, there may be modifications or additions to the data of the initial dataset. In this respect, the practitioner may desire to modify the data in the initial dataset after downloading—including updating, revising, and omitting data—or may desire to add data for use in reports, alerts, and docketing, such as data for new matters that are not reflected in the data downloaded from the USPTO. The patent practitioner is able to modify and add 26 data via different graphical user interfaces, including the ability to add matters and to add reminders for specific matters. The modifications and additions are made to the in-memory dataset representing the initial dataset. The resulting in-memory dataset constitutes a working practitioner dataset (PracDs), and the reports, alerts, and docket are all generated based on the PracDs rather than the initial dataset.

A practitioner modifications (PM) dataset is created 28 in which the net modifications and additions to the initial dataset are maintained. The net modifications and additions comprise the differences in the PracDs over the initial dataset. The PM is saved 30 to the local storage separate and apart from the initial dataset. The initial dataset is thereby maintained in a pristine form based on the XML data that is acquired from the USPTO, and is not altered by any modifications or additions that are be made by the practitioner.

Furthermore, when net modifications and additions have previously been saved to local storage, the net modifications and changes are read from the local storage 20 and applied 22 to the resulting initial dataset that is created following the download in order to create the PracDs for use in reports, alerts and docketing. Thus, steps 22 and 24 are not skipped. Instead, the PracDs is constructed each time XML data is downloaded from the USPTO by applying the PM to the initial dataset.

It is believed that the data that is available for download via Private PAIR is updated daily, and that only one download per day is necessary. Consequently, it will be appreciated that if the XML data has been downloaded for the day, and if the PracDs needs to be constructed for reports, alerts and docketing, then the PracDs can be constructed by reading 32 the previously saved initial dataset from local storage without accessing Private PAIR and downloading the XML data from the USPTO. Accordingly, a check may be performed before initiating XML data downloading form the USPTO, and the download may occur if the XML data has not yet been downloaded for the day and the XML data is needed. However, if the check indicates that the XML data has already been downloaded for the particular day, then no download from the USPTO is initiated, and the initial dataset created from the XML data that has already been downloaded for that particular day is read from local storage for constructing the PracDs.

The check may include maintaining a timestamp for each XML download associated with a customer number and deeming any download occurring after a preset time as having obtained, for that day and for that customer number, the most recent XML data available for that customer number.

The ability to construct the PracDs from the initial dataset after the XML data has been downloaded from the USPTO on a particular day can be particularly beneficial, as the downloading of the XML data from the USPTO may take an appreciable amount of time that may be noticeable to a user seeking to work with and waiting for the PracDs to be constructed. Additionally, if Private PAIR is down or otherwise unavailable, the PracDs still can be constructed for reports, alerts and docketing by using the most recently saved initial database and PM. This ability to read and construct the PracDs from local storage under such scenarios is reflected in the flowchart of FIG. 1b.

Software Implementations in Accordance with the First System Architecture

Software implementations in accordance with the first system architecture of FIG. 1 are included in the computer program listing of the present application, which is incorporated by reference herein. Such software implementations include the PAIR Insight™ 2009 program; the PAIR Insight™ 2010 program; and the Pair Access™ program.

A Second System Architecture

One or more preferred embodiments of the present invention are now described in connection with FIGS. 2-2a.

Figure 2:
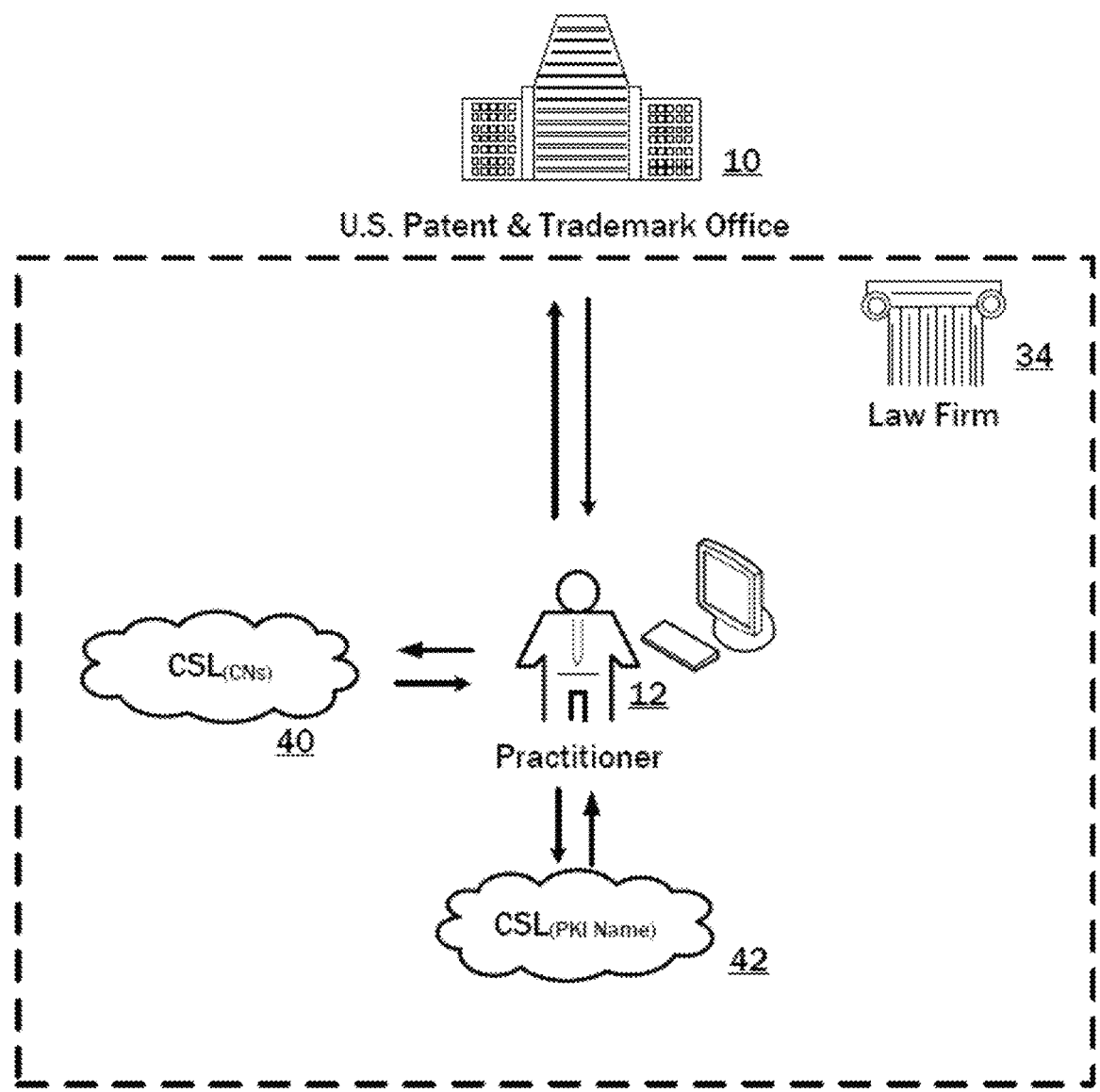
FIG. 2 is a schematic illustration of another system architecture.
Figure 2A:
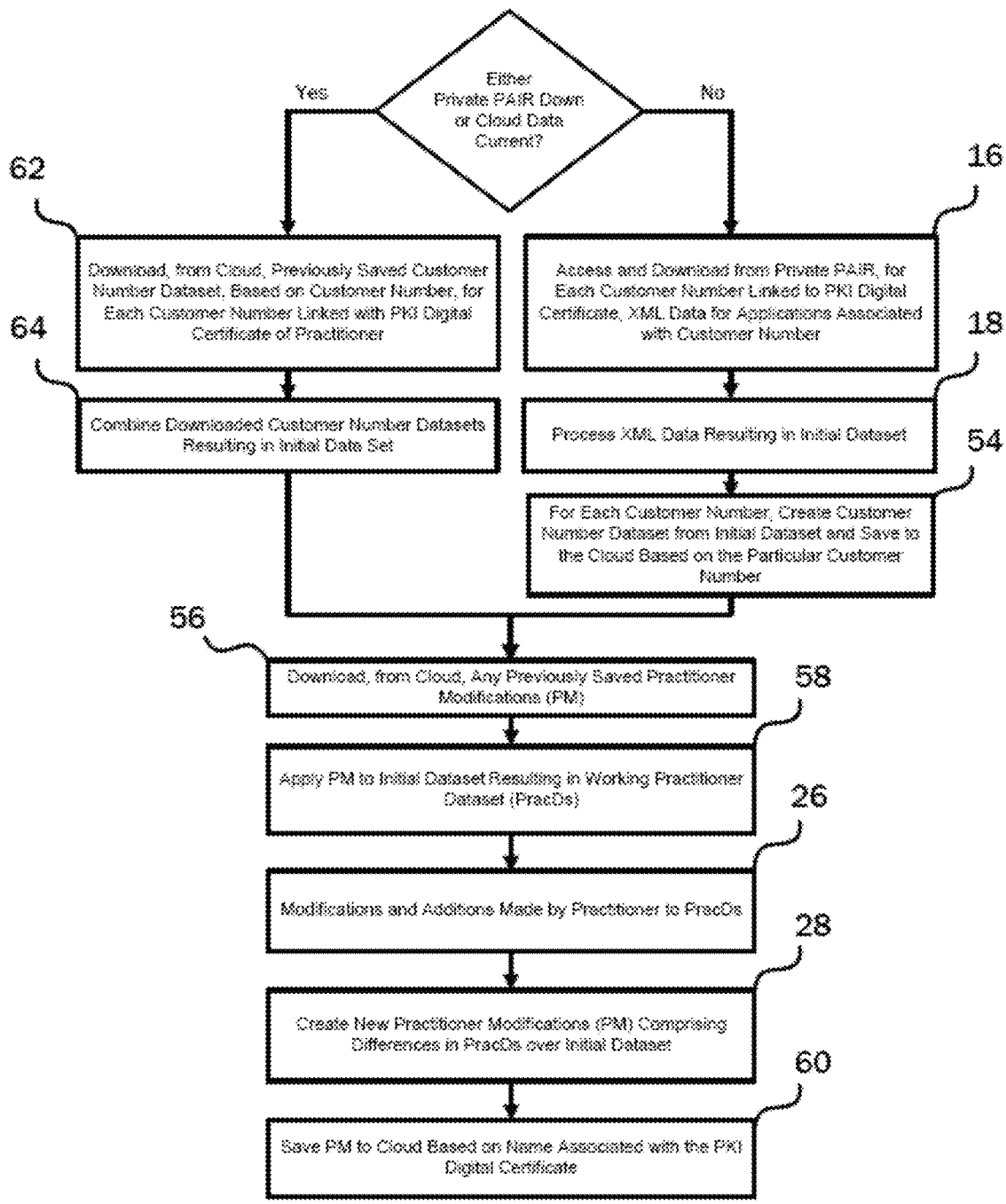
FIG. 2A is a flowchart illustrating steps of one or more preferred embodiments in accordance with the system architecture of FIG. 2.

FIG. 2 is a schematic illustration of another system architecture and FIG. 2a is a flowchart illustrating steps of one or more preferred embodiments in accordance with this system architecture.

In the system architecture of FIG. 2, information about patent properties is acquired electronically from the USPTO 10 by a patent practitioner 12 at law firm 34 using a computer, which may include a desktop pc, laptop, or server of the practitioner, and then electronically saved to a cloud storage location (CSL). Cloud storage locations are readily available as a service provided by such companies as, for example, Rackspace US, Inc. and EMC Corporation. Data may be uploaded and downloaded by any of several different protocols, as will be understood by the Ordinary Artisan. A protocol that has been found suitable in terms of speed and security is the secure file transfer protocol (SFTP). Another protocol found to be suitable is the secure hypertext transfer protocol (HTTPS). Furthermore, a combination of different protocols may be used including, for example, FTPS for uploading to a cloud storage location and HTTPS for downloading from a cloud storage location.

In one or more preferred embodiments, the cloud storage location utilizes an FPT server and includes first cloud storage that is indexed by customer numbers, indicated at 40 as $CSL_{(CNs)}$; and second cloud storage that is indexed by the name associated with the PKI digital certificate being used, indicated at 42 as $CSL_{(PKI\ Name)}$. When viewed via an FTP client program, the directory structure includes a folder titled "cns", in which are contained folders bearing titles corresponding to customer numbers. Each of these folders includes data pertaining to the customer number represented by that folder. In this way, data associated with a customer number can be accessed by simply accessing the data in the folder corresponding to the respective customer number. Similarly, the directory structure further includes a folder titled "practitioner", in which are contained folders bearing titles corresponding to practitioner names associated with PKI digital certificates. Each of these folders includes data pertaining to the practitioner whose PKI digital certificate is used, and data associated with a particular practitioner can be accessed by simply accessing the data in the folder corresponding to that practitioner.

The PKI name preferably is the name that is literally identified when the PKI digital certificate is read as a text file. It is believed that the PKI name uniquely identifies a patent practitioner. It will be appreciated by the Ordinary Artisan that, to the extent that the PKI name is not unique, then another unique identifier should be used in its place that represents a single patent practitioner to which the PKI digital certificate is issued by the USPTO. Such a unique identifier could be issued by a third party service provider who may provide, for example, the cloud storage location, the software for accessing the cloud location for uploading and downloading, or both.

With reference to FIG. 2a, the patent practitioner accesses, via the Internet, Private PAIR and downloads 16 from the USPTO, for each customer number with which the patent practitioner is associated, the XML data for all of the patent properties associated with that customer number. Such data conventionally may be manually downloaded by navigating to the customer number filter in Private PAIR, selecting a desired customer number, and then selecting the orange "XML" button. However, in accordance with preferred embodiments, the downloading is programmatically performed on demand, automatically at a scheduled time, or automatically after a predetermined period of time has elapsed. The download occurs if the XML data has not yet been downloaded for the day and the XML data is needed. It is believed that the data that is available for download via Private PAIR is updated daily, and that only one download per day is necessary.

Optionally, detailed XML data may be separately downloaded for each of one or more specific patent properties for purposes of supplementing the information about such patent property that is contained in the customer number download. Such a download includes detailed information that is not included in the general customer number download, such as a history of transactions and outgoing correspondence for the specific patent property, and title and continuity information of the specific patent property. This information can be important, for example, in better calculating deadlines when docketing. Such detailed XML information conventionally may be manually downloaded by navigating to the Application Data tab for the particular patent property in Private PAIR and then selecting the orange "XML" button. However, in accordance with one or more preferred embodiments, the downloading is programmatically performed when certain conditions are met that indicate such detailed information is needed.

Once the download of the customer number XML data is complete, the XML data from the downloaded files is processed 18 resulting in an initial dataset comprising a plurality of data tables. During the processing, the data from each of the downloaded XML files is reformatted and consolidated together. The data tables include an Application Data Table in which primary information about patent properties is stored; a Status and Transaction Data Table in which status and transaction data is stored; and a Correspondence Data Table in which outgoing correspondence information sent by the USPTO in connection with the patent properties is stored. The initial dataset is in the form of an in-memory dataset; however, it will be appreciated that, rather than use in-memory datasets, one or more databases may be used. For example, objects may be used instead of data tables, and the objects may be stored, accessed, and manipulated using a database management system such as DB4O.

Also during processing, additional data may be derived from the data that has been downloaded from the USPTO and saved, including deadlines that may be calculated from the downloaded data. The derived data may be included in one or more data tables of the initial dataset. For instance, reminders regarding deadlines can be derived from the downloaded data and then saved in a reminders data table of the initial dataset.

The initial dataset is saved 54 by creating, for each customer number, a customer number dataset representing a subset of the initial dataset that includes all of the data associated with the patent properties associated with the particular customer number. Each customer number dataset then is saved to the cloud storage location and, in particular, to the first cloud storage $CSL_{(csn)}$ in the folder that corresponds to the particular customer number of the customer number dataset. Any currently existing customer number dataset in the first cloud storage may be overwritten during the save operation.

Provided there are no previous modifications or additions by the practitioner that need to be accounted for (thus permitting steps 56 and 58 to be skipped in FIG. 2*a*), the initial dataset is used to generate and display reports to the patent practitioner; to generate and send alerts and reports via email to the patent practitioner, or other desired recipients; and to instantiate a docket of the patent practitioner. Additionally, the data may be filtered when generating reports, alerts or instantiating a docket so that only those patent properties of particular interest are included. Alternatively, such filtering may be performed when the initial dataset is created.

On the other hand, there may be modifications or additions to the data of the initial dataset. In this respect, the practitioner may desire to modify the data in the initial dataset after downloading—including updating, revising, and omitting data—or may desire to add data for use in reports, alerts, and docketing, such as data for new matters that are not reflected in the data downloaded from the USPTO. The patent practitioner is able to modify and add 26 data via different graphical user interfaces, including the ability to add matters and to add reminders for specific matters. The modifications and additions are made to the in-memory dataset representing the initial dataset. The resulting in-memory dataset constitutes a working practitioner dataset (PracDs), and the reports, alerts, and docket are all generated based on the PracDs rather than the initial dataset.

A practitioner modifications (PM) dataset is created 28 in which the net modifications and additions to the initial dataset are maintained. The net modifications and additions comprise the differences in the PracDs over the initial dataset. The PM is saved 60 to the cloud storage location and, in particular, to the second cloud storage $CSL_{(PKI\ Name)}$ in the folder that corresponds to the particular practitioner name of the PKI digital certificate being used. Any currently existing PM in the second cloud storage may be overwritten during the save operation.

It will be appreciated that the initial dataset is thereby maintained in a pristine form based on the XML data that is acquired from the USPTO, and the initial dataset is not altered by any modifications or additions that are be made by the practitioner.

Furthermore, it will be appreciated that when net modifications and additions have previously been saved to the second cloud storage, the net modifications and changes are downloaded 56 from the second cloud storage and applied 58 to the initial dataset that is created following the download of the XML data in order to create the PracDs for use in reports, alerts and docketing. Thus, steps 56 and 58 are not skipped. Instead, the PracDs is constructed each time XML data is downloaded from the USPTO by applying any previously saved PM to the initial dataset.

It is believed that the data that is available for download via Private PAIR is updated daily, and that only one download per day is necessary. Consequently, it will be appreciated that if the XML data has been downloaded for the day, and if the PracDs needs to be constructed for reports, alerts and docketing, then the PracDs can be constructed by downloading 62 the previously saved customer number datasets from the first cloud storage and combining 64 them to form the initial dataset, thereby avoiding any need to access Private PAIR and again download the XML data from the USPTO for all of the customer numbers. Accordingly, a check may be performed before initiating XML data downloading form the USPTO, and the download may occur if the XML data has not yet been downloaded for the day and the XML data is needed. However, if the check indicates that the XML data has already been downloaded for the particular day, then no download from the USPTO is initiated, and the customer number datasets already created from the XML data that has been downloaded for that particular day is read from the first cloud storage for constructing the PracDs.

The check may include maintaining a timestamp for each XML download associated with a customer number and deeming any download occurring after a preset time as having obtained, for that day and for that customer number, the most recent XML data available for that customer number.

The ability to construct the PracDs from the customer number datasets after the XML data has been downloaded from the USPTO on a particular day can be particularly beneficial, as the downloading of the XML data from the USPTO may take an appreciable amount of time that may be noticeable to a user seeking to work with and waiting for the PracDs to be constructed. Additionally, if Private PAIR is down or otherwise unavailable, the PracDs still can be constructed for reports, alerts and docketing by using the most recently saved customer number datasets and PM. This ability to read and construct the PracDs from the data saved to the cloud storage location under such scenarios is reflected in the flowchart of FIG. 2*a*.

Software Implementations in Accordance with the Second System Architecture

A software implementation in accordance with the second system architecture of FIG. 2 is included in the computer program listing of the present application, which is incorporated by reference herein. Such software implementation comprises early version(s) of the "Searchlight" program.

A Third System Architecture

One or more preferred embodiments of the present invention are now described in connection with FIGS. 3-3*a*.

Figure 3:
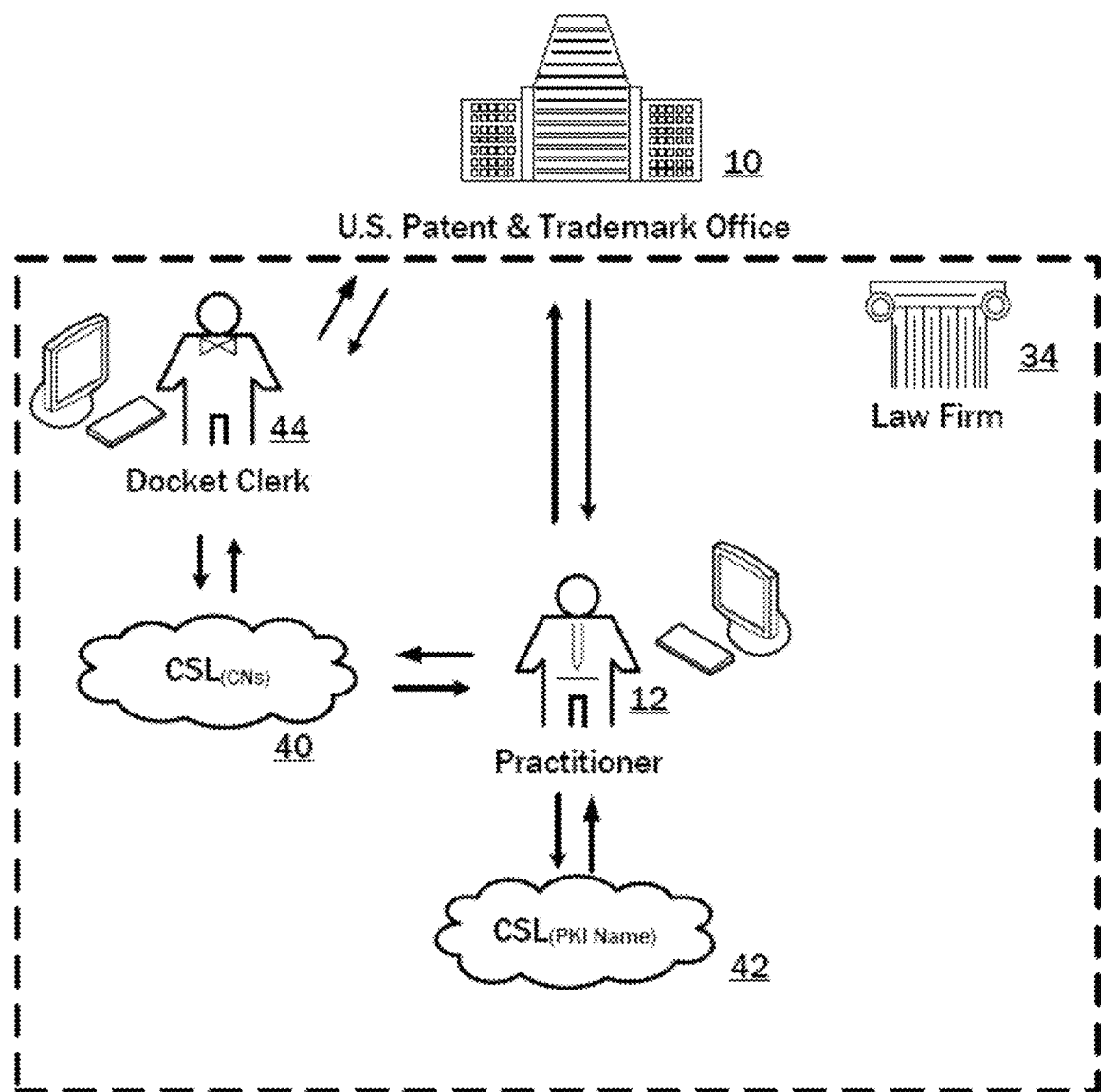
FIG. 3 is a schematic illustration of another system architecture.
Figure 3A:
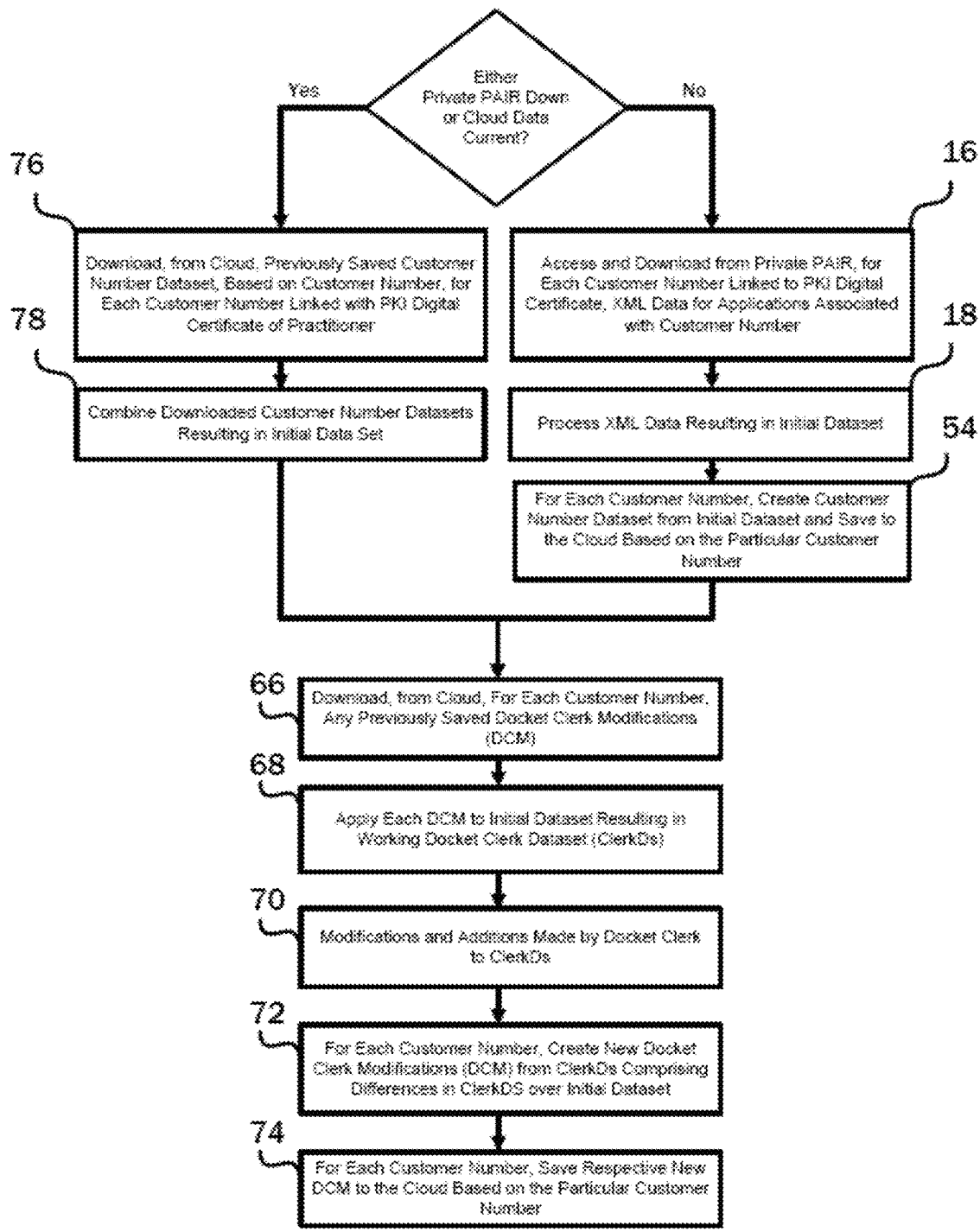
FIGS. 3A and 3B are flowcharts illustrating steps of one or more preferred embodiments in accordance with the system architecture of FIG. 3.

FIG. 3 is a schematic illustration of another system architecture and FIG. 3*a* is a flowchart illustrating steps of one or more preferred embodiments in accordance with this system architecture. The system architecture of FIG. 3 is similar to that of FIG. 2, and only the differences are discussed herein, the foregoing description corresponding to FIGS. 2-2*a* applying to that of FIGS. 3-3*a* except where noted or where logic necessarily dictates otherwise.

In accordance with the system architecture of FIG. 3, the law firm 34 includes a docket clerk 44. The docket clerk utilizes the PKI digital certificate of the practitioner 12 for accessing Private PAIR and downloading the XML data for the patent properties associated with all of the customer numbers of the law firm 34 (with which the patent practitioner's PKI digital certificate presumably is associated). The XML data that is downloaded from each customer number is then processed 18, resulting in the initial dataset. As before, the initial dataset is then saved 54 by creating, for each customer number, a customer number dataset representing a subset of the initial dataset that includes all of the data associated with the patent properties associated with that particular customer number. Each customer number dataset then is saved to the cloud storage location and, in particular, to the first cloud storage $CSL_{(csn)}$ in the folder that corresponds to the particular customer number of the customer number dataset. Any currently existing customer number dataset in the first cloud storage may be overwritten during the save operation.

Provided there are no previous modifications or additions by the docket clerk that need to be accounted for (thus permitting steps 66 and 68 to be skipped in FIG. 3*a*), the initial dataset is used to generate and display reports to the docket clerk; to generate and send alerts and reports via email to the docket clerk, or other desired recipients; and to instantiate a docket of law firm 34.

On the other hand, there may be modifications or additions to the data of the initial dataset. In this respect, the docket clerk may desire to modify the data in the initial dataset after downloading—including updating, revising, and omitting data—or may desire to add data for use in reports, alerts, and docketing, such as data for new matters that are not reflected in the data downloaded from the USPTO. The docket clerk is able to modify and add 70 data via different graphical user interfaces, including the ability to add matters and to add reminders for specific matters. The modifications and additions are made to the in-memory dataset representing the initial dataset. The resulting in-memory dataset constitutes a working docket clerk dataset (ClerkDs), and the reports, alerts, and docket are all generated based on the ClerkDs rather than the initial dataset.

For each customer number, a docket clerk modifications (DCM) dataset is created 72 from the ClerkDs that comprises the differences in the ClerkDs over the initial dataset. The DCM for each customer number then is saved 74 to the first cloud storage in association with that customer number and, in particular, is saved in the folder that corresponds to the particular customer number. Any currently existing DCM for that customer number in the first cloud storage may be overwritten during the save operation.

It will be appreciated that the initial dataset is thereby maintained in a pristine form based on the XML data that is acquired from the USPTO, and the initial dataset is not altered by any modifications or additions that are be made by the docket clerk.

Furthermore, it will be appreciated that when net modifications and additions by the docket clerk have previously been saved to the first cloud storage, the net modifications and changes are downloaded 66 from the first cloud storage and applied 68 to the initial dataset that is created in order to create the ClerkDs for use in reports, alerts and docketing. Thus, steps 66 and 68 are not skipped when there is one or more DCMs.

It is believed that the data that is available for download via Private PAIR is updated daily, and that only one download per day is necessary. Consequently, it will be appreciated that if the XML data has been downloaded for the day, and if the ClerkDs needs to be constructed for reports, alerts and docketing, then the ClerkDs can be constructed by downloading 62 the previously saved customer number datasets from the first cloud storage and combining 64 them to form the initial dataset, thereby avoiding any need to access Private PAIR and again download the XML data from the USPTO for all of the customer numbers. Accordingly, a check may be performed before initiating XML data downloading form the USPTO, and the download may occur if the XML data has not yet been downloaded for the day and the XML data is needed. However, if the check indicates that the XML data has already been downloaded for the particular day, then no download from the USPTO is initiated, and the customer number datasets already created from the XML data that has been downloaded for that particular day is read from the first cloud storage for constructing the ClerkDs.

The check may include maintaining a timestamp for each XML download associated with a customer number and deeming any download occurring after a preset time as having obtained, for that day and for that customer number, the most recent XML data available for that customer number.

The ability to construct the ClerkDs from the customer number datasets after the XML data has been downloaded from the USPTO on a particular day can be particularly beneficial, as the downloading of the XML data from the USPTO may take an appreciable amount of time that may be noticeable to a user seeking to work with and waiting for the ClerkDs to be constructed. Additionally, if Private PAIR is down or otherwise unavailable, the ClerkDs still can be constructed for reports, alerts and docketing by using the most recently saved customer number datasets and DCMs. This ability to read and construct the ClerkDs from the data saved to the first cloud storage under such scenarios is reflected in the flowchart of FIG. 3*a*.

The practitioner 12 also has the ability to work with reports, alerts and docketing.

Figure 3B:
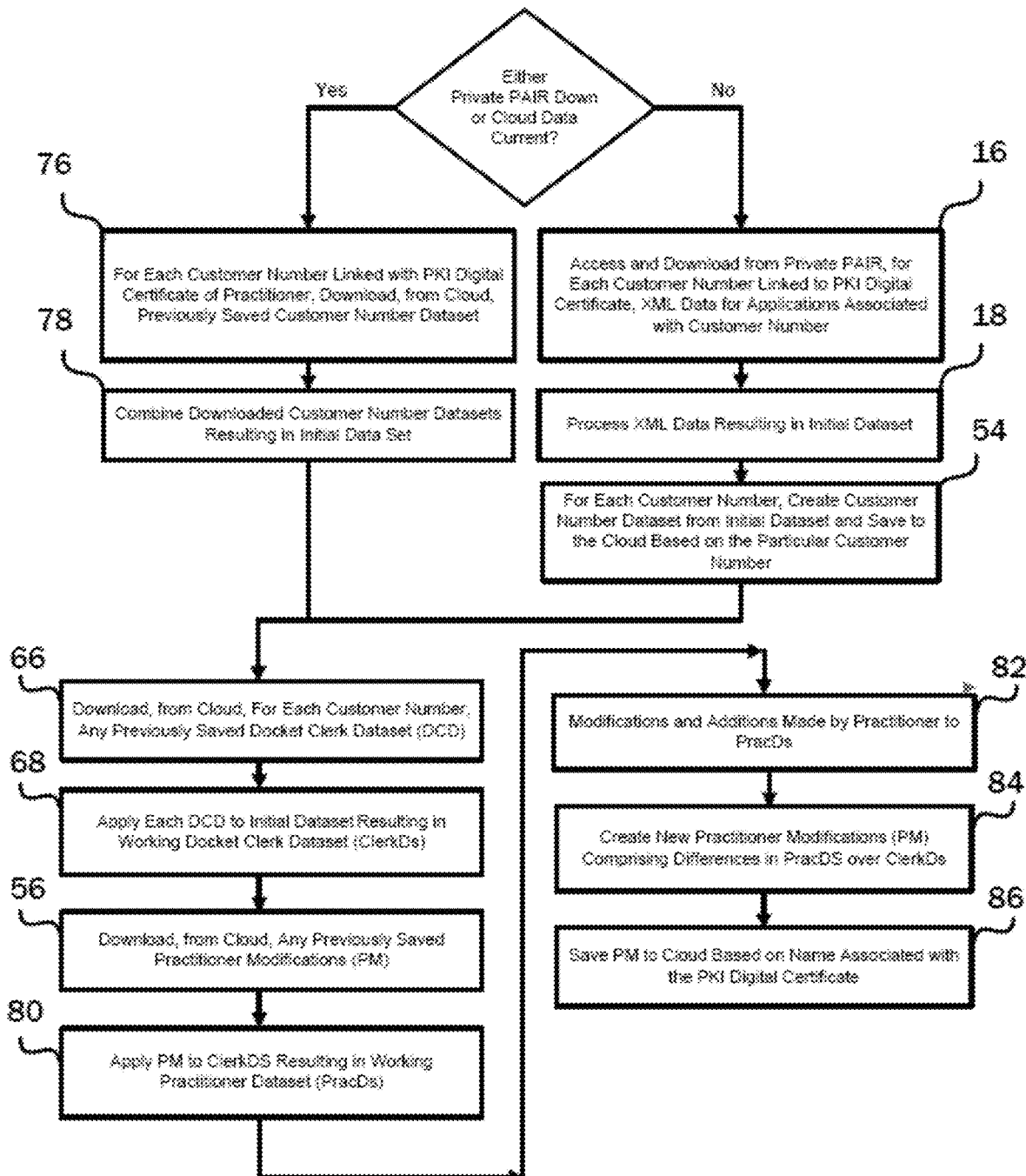

In this respect, and with reference now to FIG. 3*b*, the practitioner 62 downloads the previously saved customer number datasets from the first cloud storage and combines 64 them to form the initial dataset Next, for each customer number, any associated DCM is downloaded 76 and applied 78 to the initial dataset, resulting in the ClerkDs. The practitioner modifications (PM) dataset, if any, then is downloaded 56 from the second cloud storage and applied 80 to the ClerkDs, resulting in the Practitioner Dataset (PracDs).

The practitioner, in working with reports, alerts or docketing, may desire to modify the data in the PracDs—including updating, revising, and omitting data—or may desire to add data for use in reports, alerts, and docketing, such as data for new matters that are not reflected in the ClerkDs. The practitioner is able to modify and add 82 data via different graphical user interfaces, including the ability to add matters and to add reminders for specific matters. The modifications and additions are made to the in-memory dataset representing the PracDs. Thereafter, when the practitioner is finished working with the reports, alerts, or docketing, a new practitioners modifications (PM) dataset is created 84 from the PracDs representing the differences in the PracDs over the ClerkDs. The new PM then is saved 86 to the second cloud storage.

It will be appreciated that the data may be filtered when generating reports, alerts or instantiating a docket so that only those patent properties of particular interest are included. Alternatively, such filtering may be performed when the ClerkDs or PracDs is created by the practitioner.

It will further be appreciated that the initial dataset and the ClerkDs is not altered by any actions of the practitioner. Indeed, the ClerkDs is constructed from the XML data download from the USPTO and the net modifications and additions made by the docket clerk. No action by the practitioner affects this data. ON the other hand, the PracDs is modified by the practitioner, whereby the practitioner may thus customize the data to his or her own purposes without affecting the data used by the docket clerk as well as other in the firm. As such, the reports, alerts and docketing provided for each respective practitioner are personal to—and within the individual control of—that practitioner.

Finally, with additional reference to FIGS. 3 and 3*b*, it will be appreciated that if the docket clerk does not download the XML data for a particular day before the practitioner runs his or her program, and if Private PAIR is available and is not down, then the practitioner will—at least for that day—access and download 16 the XML data from the USPTO, process the data 18, and create and save 54 the customer number datasets to the first cloud storage location.

A Fourth System Architecture

One or more preferred embodiments of the present invention are now described in connection with FIG. 4.

Figure 4:
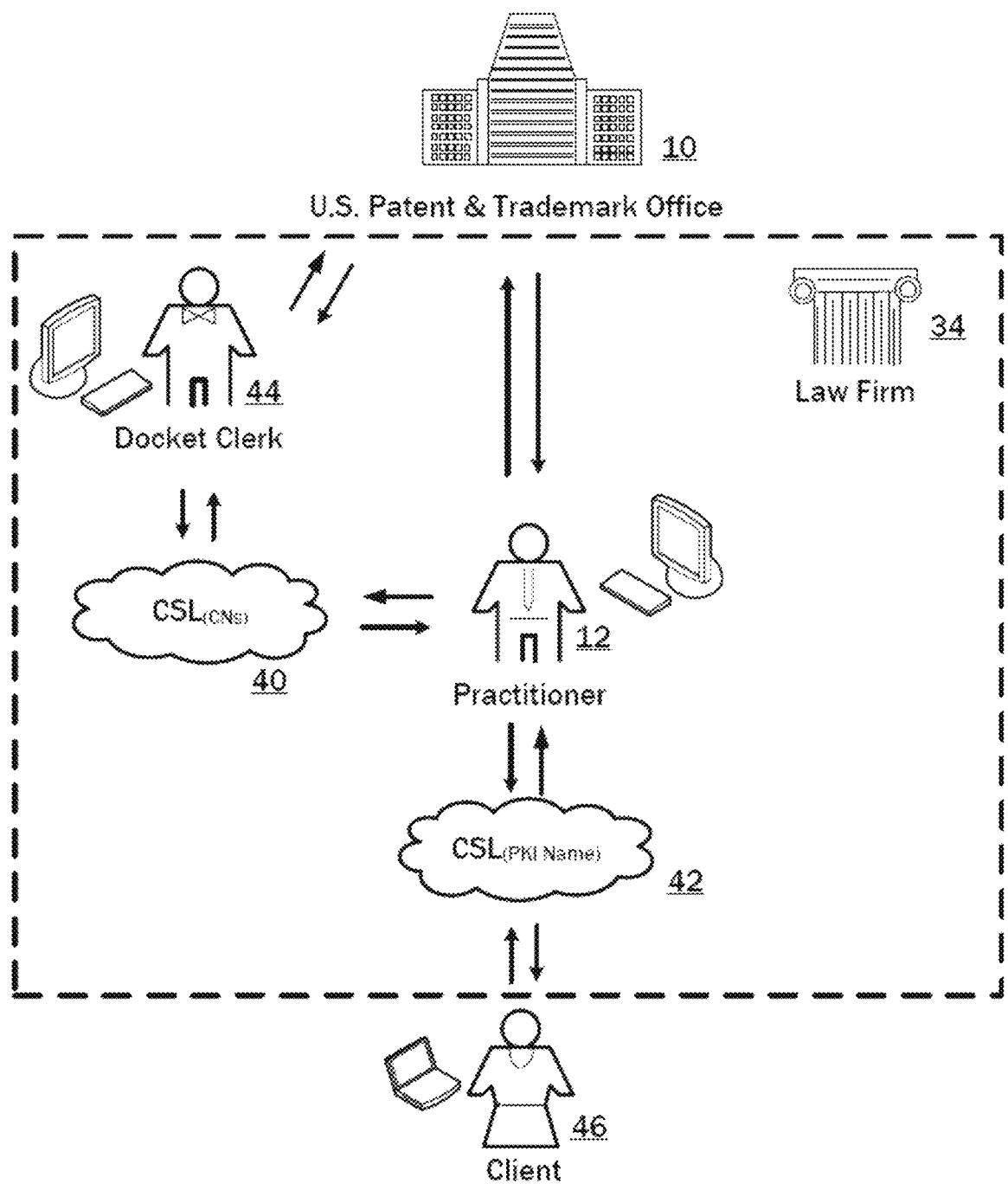
FIG. 4 is a schematic illustration of another system architecture.

FIG. 4 is a schematic illustration of another system architecture. The system architecture of FIG. 4 is similar to that of FIG. 3, and only the differences are discussed herein, the foregoing description corresponding to FIGS. 3-3*a* applying to that of FIG. 4 except where noted or where logic necessarily dictates otherwise.

In accordance with the system architecture of FIG. 4, a client 46 of the law firm 34 has access to data regarding that client's patent properties for generating reports, email alerts, docketing, or combination thereof. Access by the client to the data is enabled by providing the client a program that is configured to download, from the second cloud storage 42 and, specifically, from the folder associated with the practitioner representing the client, a dataset comprising that client's data. The client dataset is saved with the filename of the client reference used by the law firm, which is presumably a unique identifier of the client. The client dataset is created from the PracDs and includes any modifications or additions made by the practitioner, as well as any modifications or additions made upstream of the practitioner by the docket clerk.

Moreover, the client dataset includes the latest XML data as programmatically downloaded from the USPTO. Indeed, in order to insure that the data is current as of the day, the program used by the practitioner and the program used by the docket clerk preferably run at least once each day for at least the purpose of updating the XML data that is downloaded from the USPTO and updating the client dataset that is available for access by the client.

An authentication system preferably is used to authenticate the client before the client dataset is downloaded. One authentication system maintains an association between the practitioner name, the client reference, and a password. When the client program is run, the client enters the practitioner name, client reference, and password. The program then looks to the credentials list in the second cloud storage that corresponds to the practitioner name, looks up the client reference in the credentials list, and compares the password associated with the client reference in the list to the password entered by the client. If the passwords match, then the client dataset corresponding to the client reference is downloaded from the that respective practitioner folder.

The client references and password in the credentials list preferably are maintained by the practitioner through one or more graphical user interfaces of the program used by the practitioner.

It will be appreciated that using the program, the client is able to programmatically monitor information about that client's patent properties using the most current data, all without having to manually contact the practitioner or law firm. Indeed, the information available to the client is as current as the information that is available to the practitioner. Moreover, the information is programmatically provided without the client having access to the practitioner's PKI digital certificate or associated password.

Software Implementation with Client Patent Reporting

A software implementation in which clients are provided means for generating reports from client datasets can be found in the computer program listing, which is incorporated herein by reference. Specifically, the Patent Reporter™ enables a client to enter a client reference and associated password and, upon authentication, download that client's data and view reports that are generated with the data. The credentials list that is used in with the patent reporter is maintained by a practitioner as a feature of the Searchlight™ program, previously referenced hereinabove.

A Fifth System Architecture

One or more preferred embodiments of the present invention are now described in connection with FIG. 5.

Figure 5:
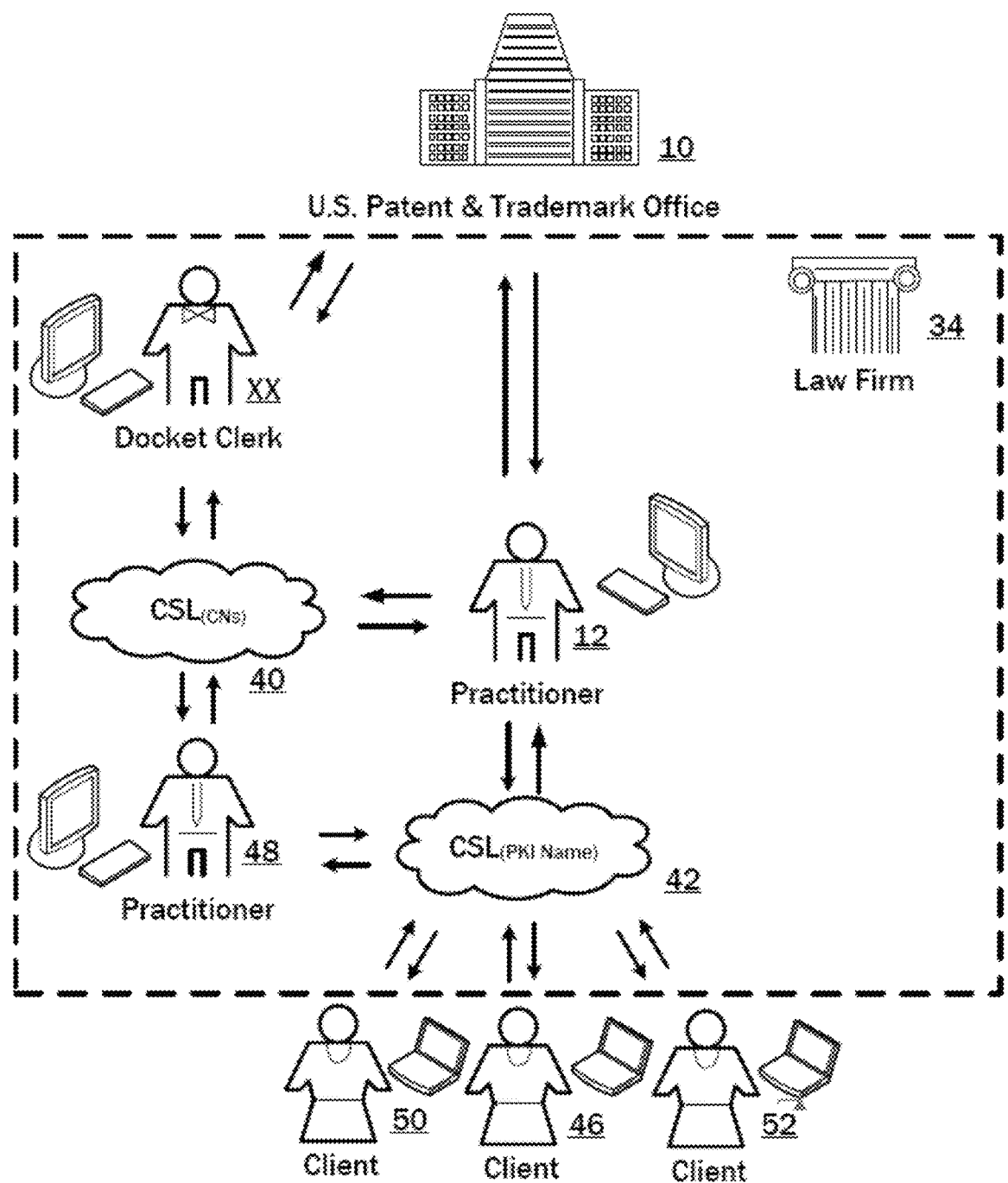
FIG. 5 is a schematic illustration of another system architecture.

FIG. 5 is a schematic illustration of another system architecture. The system architecture of FIG. 5 is similar to that of FIG. 4, and only the differences are discussed herein, the foregoing description corresponding to FIG. 4 applying to that of FIG. 5 except where noted or where logic necessarily dictates otherwise.

In accordance with the system architecture of FIG. 5, multiple practitioners 12,48 are explicitly shown as accessing the first cloud storage for generating and working with reports, email and docketing. Moreover, each practitioner 12,48 saves his or her practitioner modifications (PM) dataset to the second cloud storage, as well as saves respective client datasets and credential list to the second cloud storage 42. Each practitioner may provide a different client access to his or her client dataset. Thus, for example, practitioner 12 provides client 46 with access to that client's dataset in that practitioner's folder in the second cloud storage 42; similarly, practitioner 48 provides client 50 with access to that client's dataset in that the folder of practitioner 48 in the second cloud storage 42. In addition thereto, each practitioner 12,48 may provide a respective client dataset generated from that practitioner's PracDs to the same client 52. The client 52 thus may generate and work with reports, email, and docketing using either client dataset, as desired, by entering the particular practitioner's name, the client reference (presumably the same for both practitioners), and the password established by the respective practitioner. While this may seem at first duplicitous, this dichotomy can work well when different practitioners are working on different groups of cases, especially for a large corporate client with many patent properties; and when the client is a corporate client with multiple client contacts and each desires to work with reports, email, and docketing for a selected group of patent properties of particular interest to that client contact.

A Sixth System Architecture

One or more preferred embodiments of the present invention are now described in connection with FIG. 6.

Figure 6:
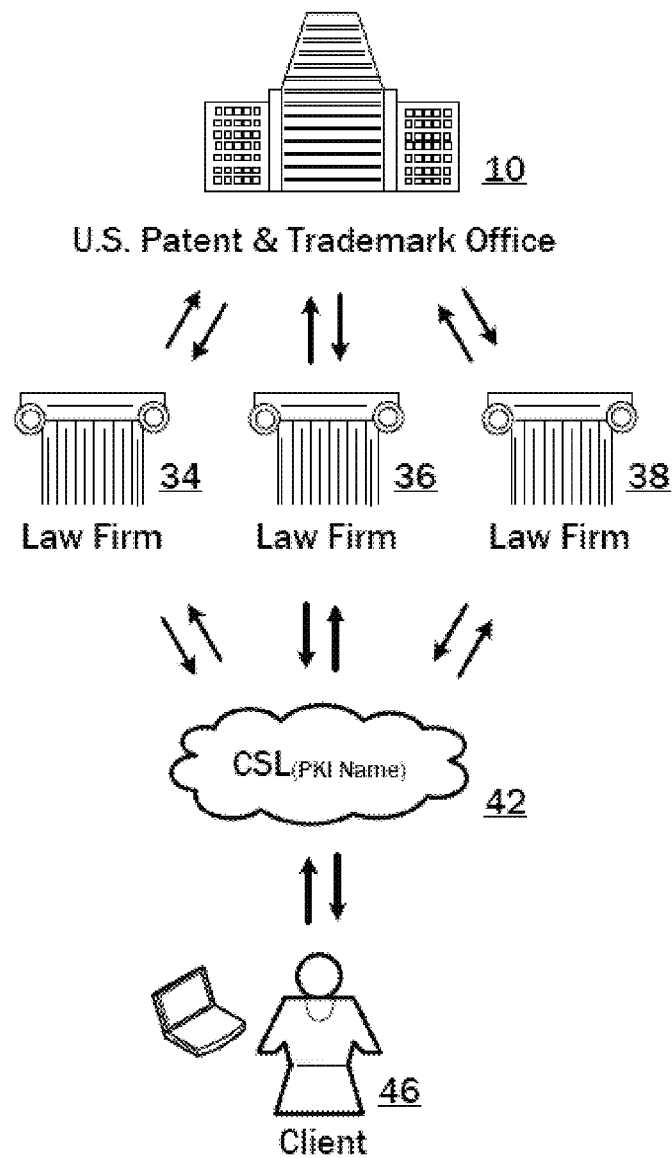
FIG. 6 is a schematic illustration of another system architecture.
Figure 7:
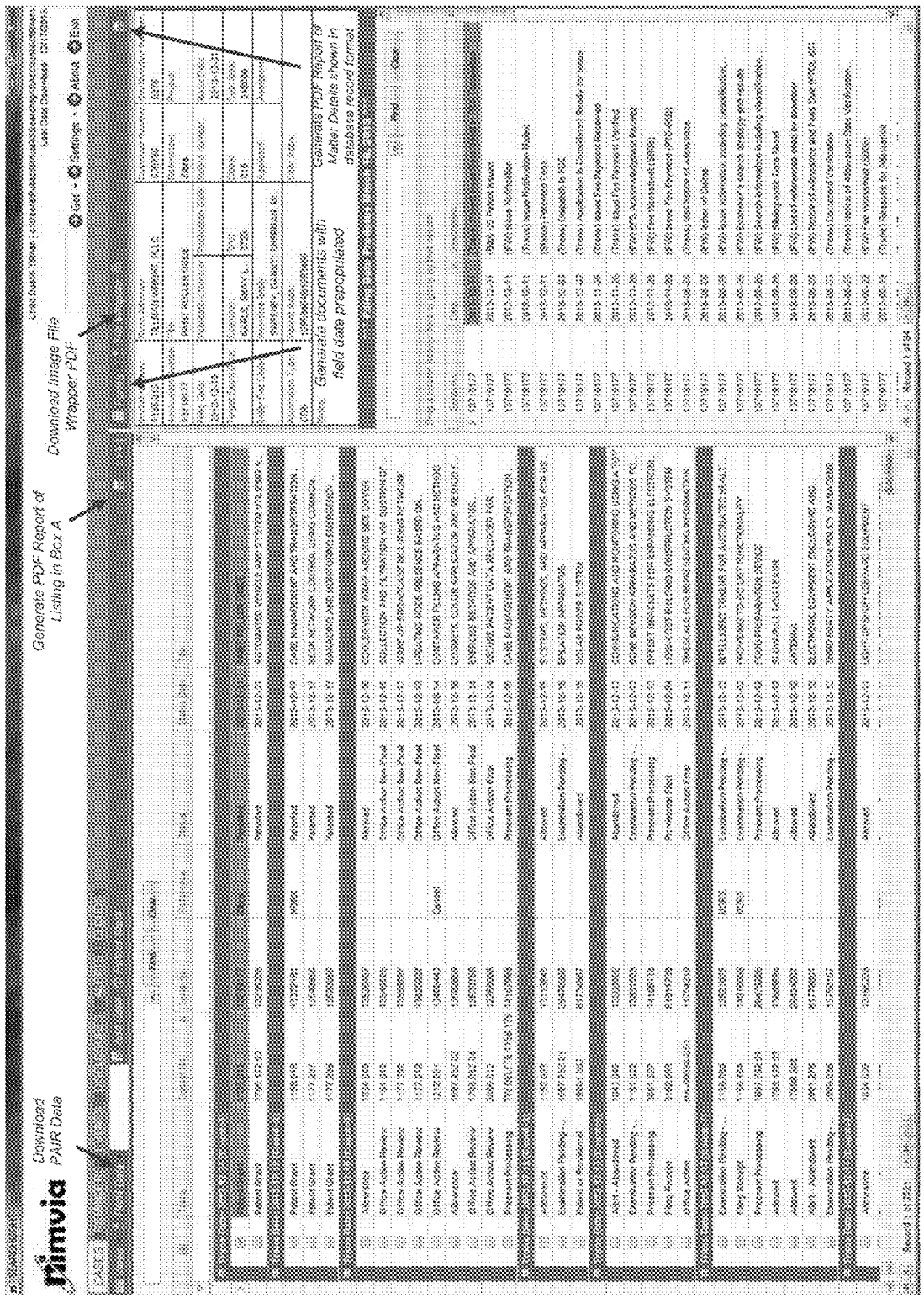
FIG. 7 is a screenshot of a graphical user interface with user controls showing a page of a tab control in accordance with one or more preferred embodiments of the invention.
Figure 8:
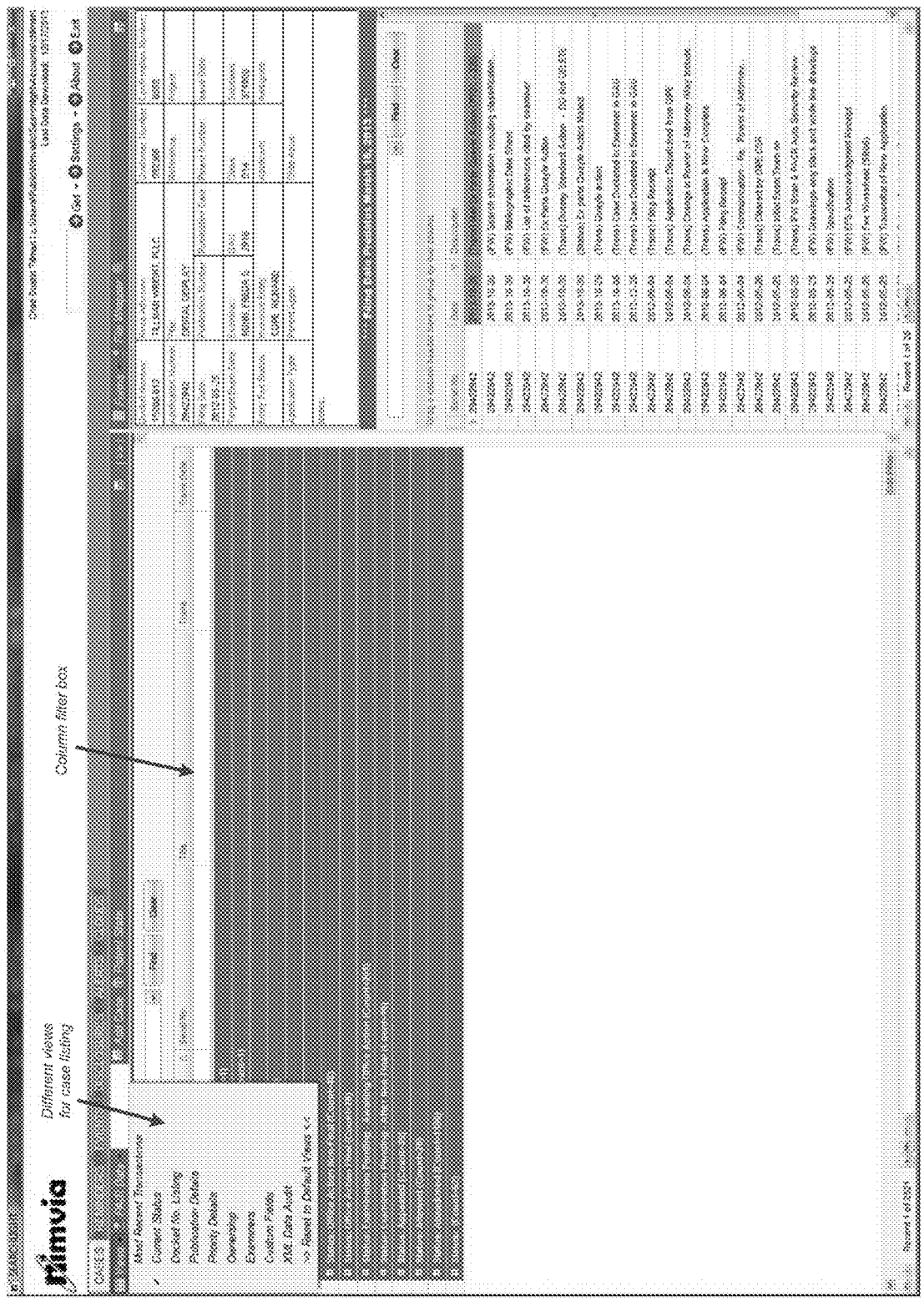
FIG. 8 is a screenshot of a graphical user interface with user controls showing a page of a tab control in accordance with one or more preferred embodiments of the invention.
Figure 9:
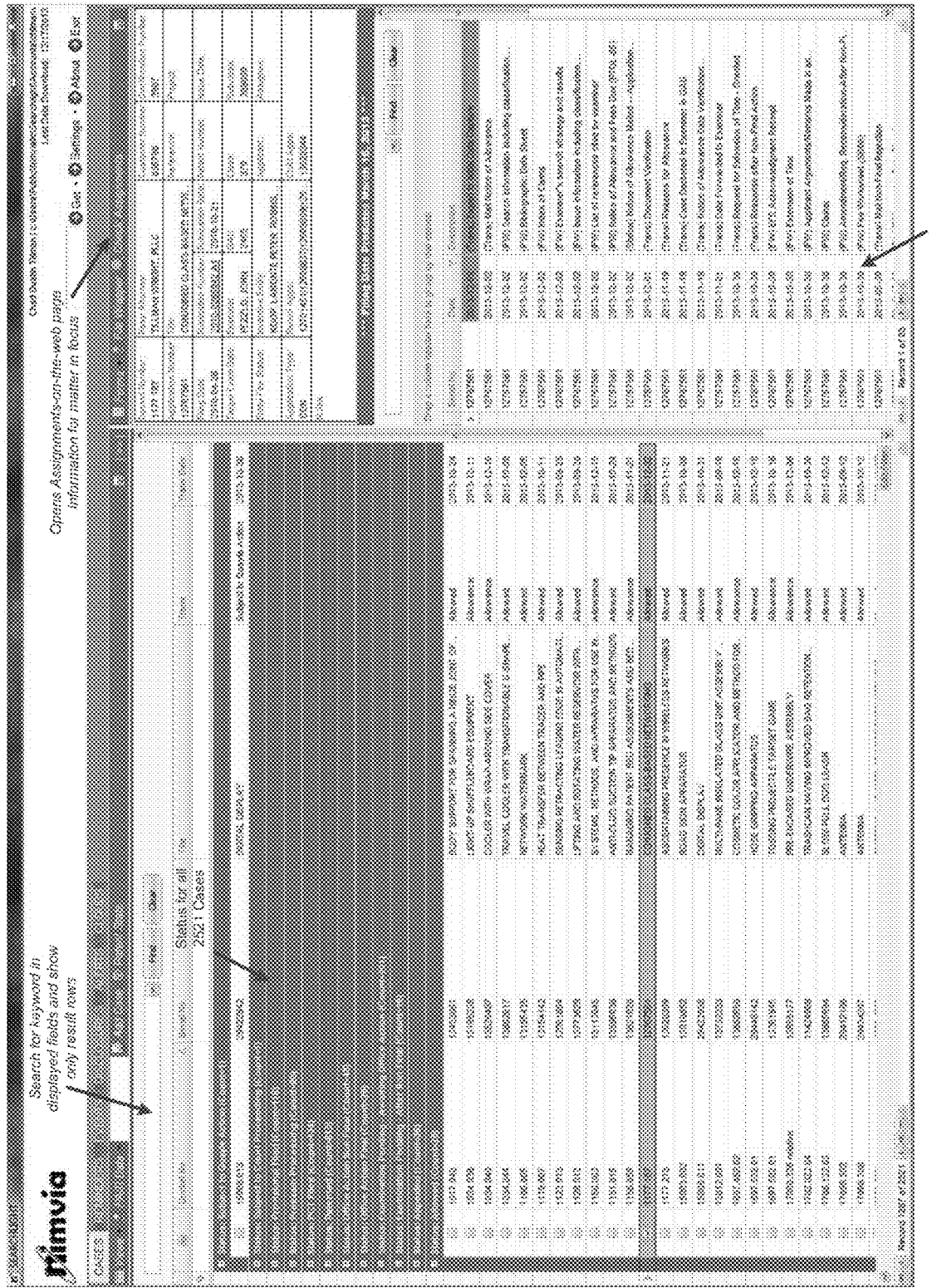
FIG. 9 is a screenshot of a graphical user interface with user controls showing a page of a tab control in accordance with one or more preferred embodiments of the invention.
Figure 10:
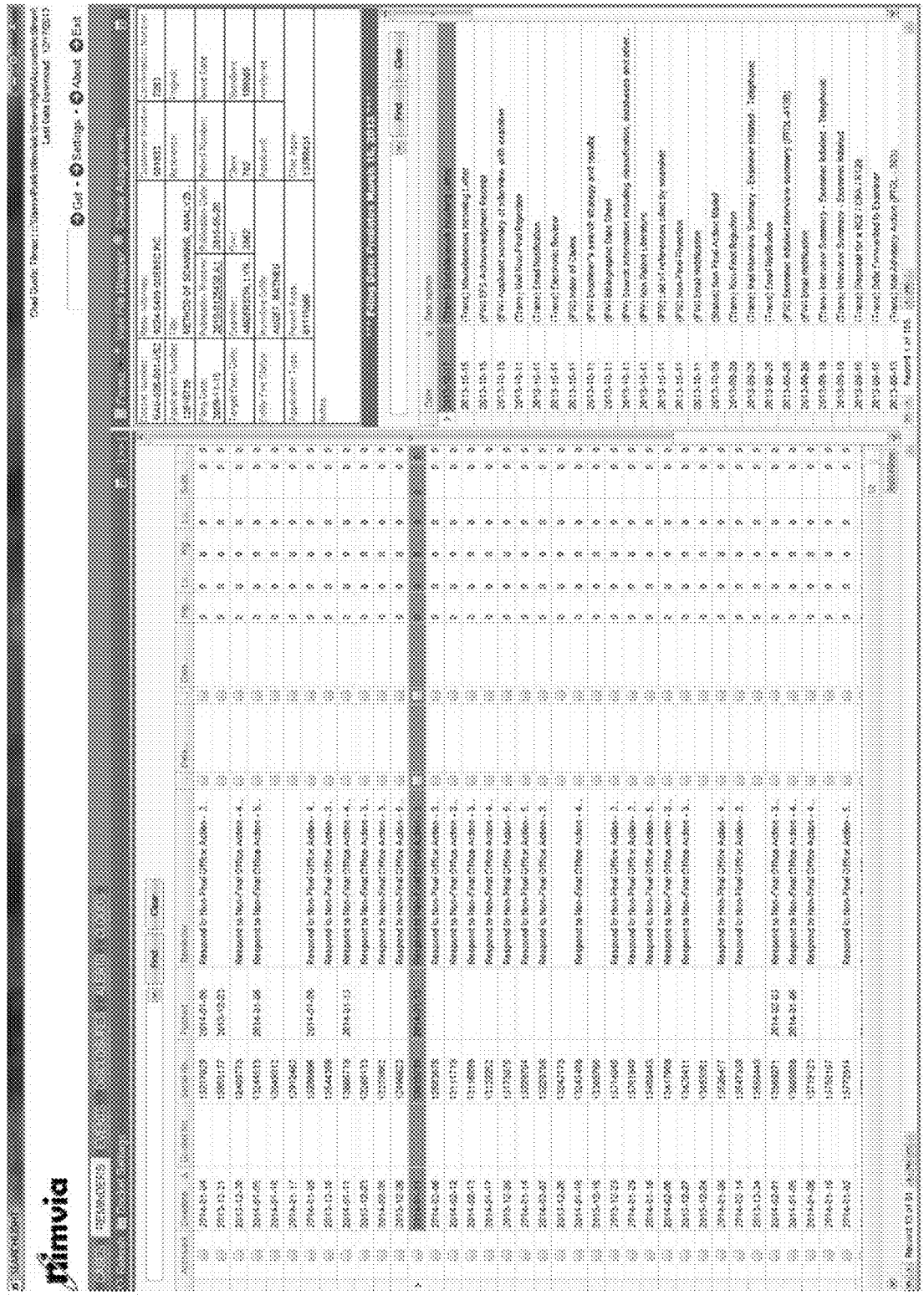
FIG. 10 is a screenshot of a graphical user interface with user controls showing a page of a tab control in accordance with one or more preferred embodiments of the invention.

FIG. 6 is a schematic illustration of another system architecture. The system architecture of FIG. 6 is similar to that of FIG. 4, and only the differences are discussed herein, the foregoing description corresponding to FIG. 4 applying to that of FIG. 6 except where noted or where logic necessarily dictates otherwise.

In accordance with the system architecture of FIG. 6, multiple law firms 34,36,38 are explicitly shown as working with a common client 46, which is not unusual when the client is a large corporate client. The client 46 has been given access by a practitioner at each law firm to that respective practitioner's folder in the second cloud storage 42, whereby the client can download that client's respective dataset from each law firm. In the preferred embodiments in this system, the client program combines the client datasets into a single dataset for working with reports, email and docketing. The client 46 is thereby provided a complete and consolidated view of that client's patent properties that are maintained by multiple law firms, with data that is the most current available, even to the practitioners of the client.

Additional Improvements, Processes, and Optimizations

In accordance with additional aspects and features the present invention, optimizations and processes are included in the foregoing disclosed embodiments that are believed to minimize accessing the online computer system of the USPTO and/or facilitate efficient and synergistic case management and docketing. Such optimizations and processes are found in the attached source code of the computer program listing.

Such optimizations and processes include storing data associated with a digital certificate of a practitioner at a server and first downloading data from the server when using the digital certificate, checking the data for timeliness, and then proceeding to download data from the USPTO when the data downloaded from the server is determined to outdated; storing data associated with a particular customer number at a server and first downloading data from the server when using a digital certificate associated with the particular customer number, checking the data for timeliness, and then proceeding to download data from the USPTO when the data associated with the particular customer number that is downloaded from the server is determined to be outdated. In either feature, once data is downloaded from the USPTO either for a customer number or a digital certificate, the data is uploaded to the server in association therewith for the benefit of others associated with the customer number of using the digital certificate. In addition to data associated with a particular customer number or a particular digital certificate, for data that is publicly available, such data that is downloaded by a practitioner also may be uploaded to a server for use by others seeking the same data. These additional optimizations and processes preferably are programmatically performed without action by a user.

Figure 13:
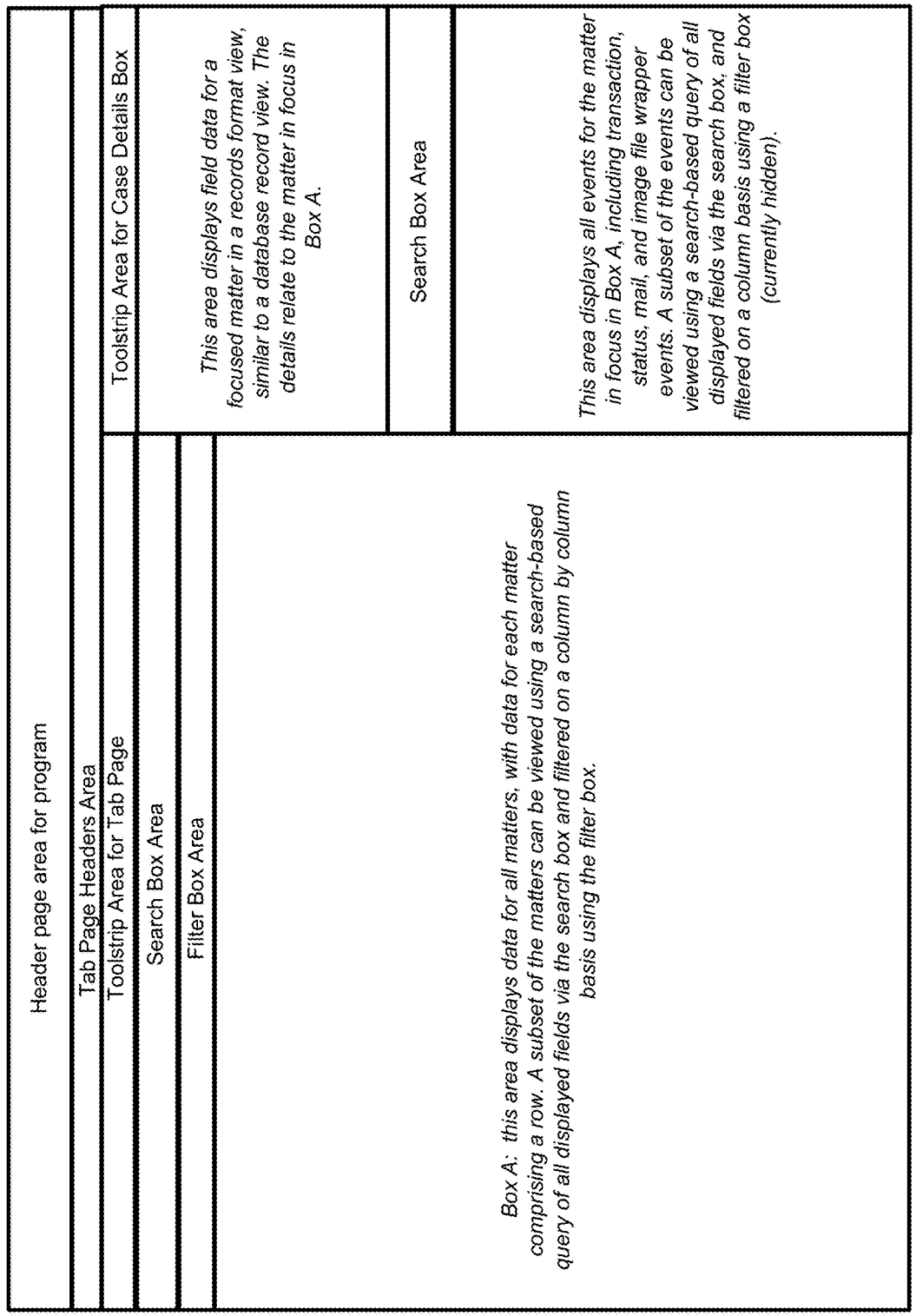
FIG. 13 is a screenshot of a graphical user interface with user controls showing a page of a tab control in accordance with one or more preferred embodiments of the invention.

Additional aspects comprise improvements in the user interface, including functionality and associated layout of the user controls. For example, with reference to FIGS. 7-10 and 12, and a corresponding wireframe shown in FIG. 13, a docketing and case management system is provided having an "Excel" or spreadsheet feel to it for users, wherein all of the data is available in grid form with direct access to the underlying data without searching for and modifying individual records, as experienced current docketing systems. As another example, a tab control is provided in which a first tab represent a listing of cases; another tab represents a listing of events found in all of the cases, including all status, transaction, mail, and image file wrapper events, whereby cases can be 'looked up' and directly viewed based on an events listing; and another tab includes deadline reminders that are programmatically generated based on events.

Figure 11:
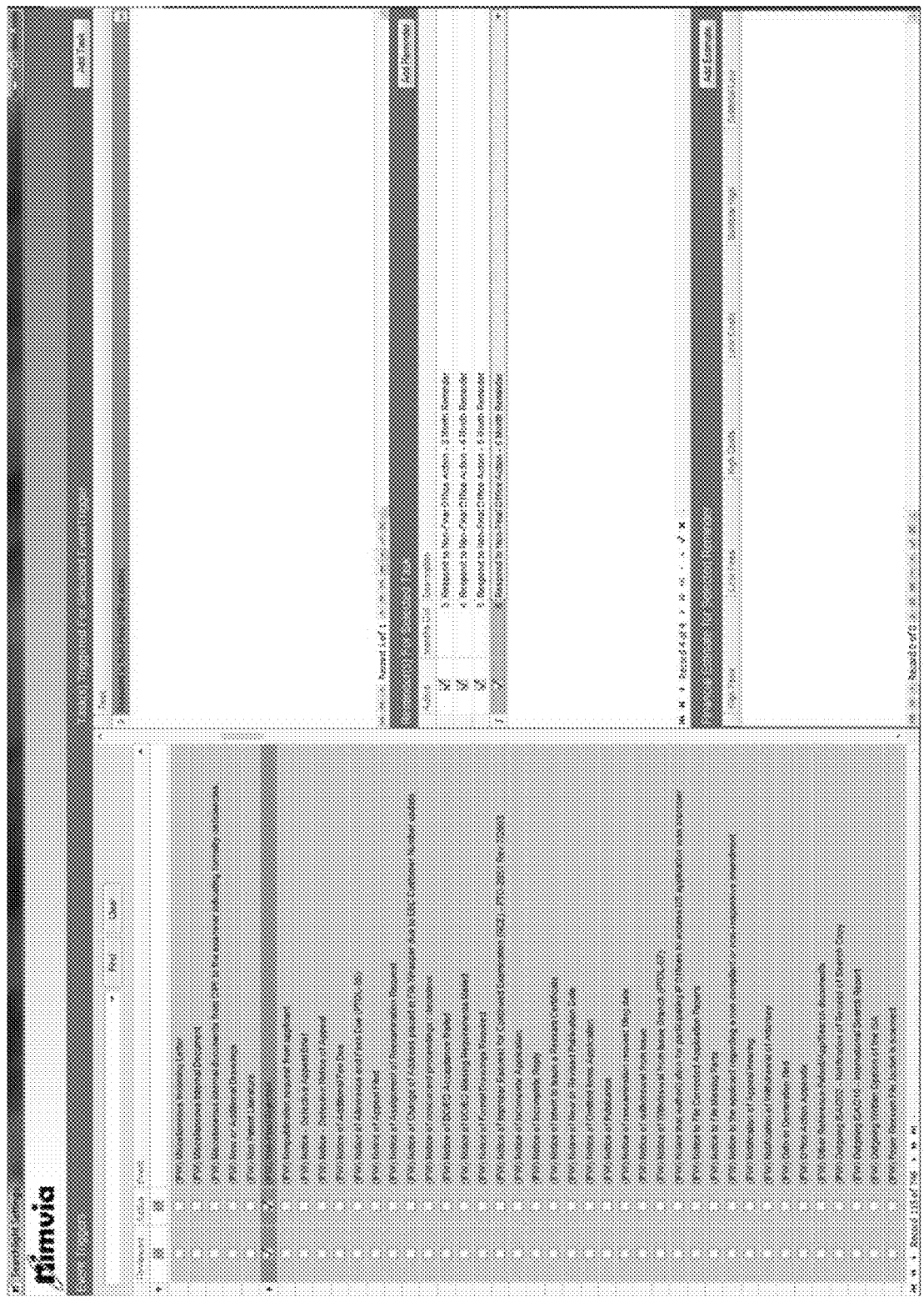
FIG. 11 is a screenshot of a graphical user interface with user controls showing a page of a tab control in accordance with one or more preferred embodiments of the invention.
Figure 12:
FIG. 12 is a screenshot of a graphical user interface with user controls showing a page of a tab control in accordance with one or more preferred embodiments of the invention.

A user interface like that of FIG. 11 also preferably is provided for adding, deleting, and modifying rule sets for generating reminders, with reminders being generated on user demand as well as programmatically with existing reminders being updated with revised deadlines, where appropriate and where such deadlines have not been marked reviewed or completed by the user. The arrangement of information and user controls is believed to be innovative over currently existing systems and is believed to provide a synergy and efficiently in case management and docketing that is not realized by conventional systems.

Additional tabs may be provided for managing invention disclosures, email alerts, and subsets of the data that are published to clients through 'clouds' made accessible to clients respectively.

In additional features, the case listing includes a plurality of views, including a docket inventory listing, a reverse chronological transactions listing, a status listing, an examiner listing, a data download audit listing, a priority fields listing, an ownership listing, and a publications listing. The status, transactions, and examiners listing preferably is grouped by status, transaction date, and examiner name respectively. Moreover, as there may be a significant number of different events, each preferably is mapped to a predefined short list of transactions and status descriptions, or ignored outright if no mapping is provided, whereby an efficient and 'noiseless' listing of status and transactions may be provided.

Figure 14:
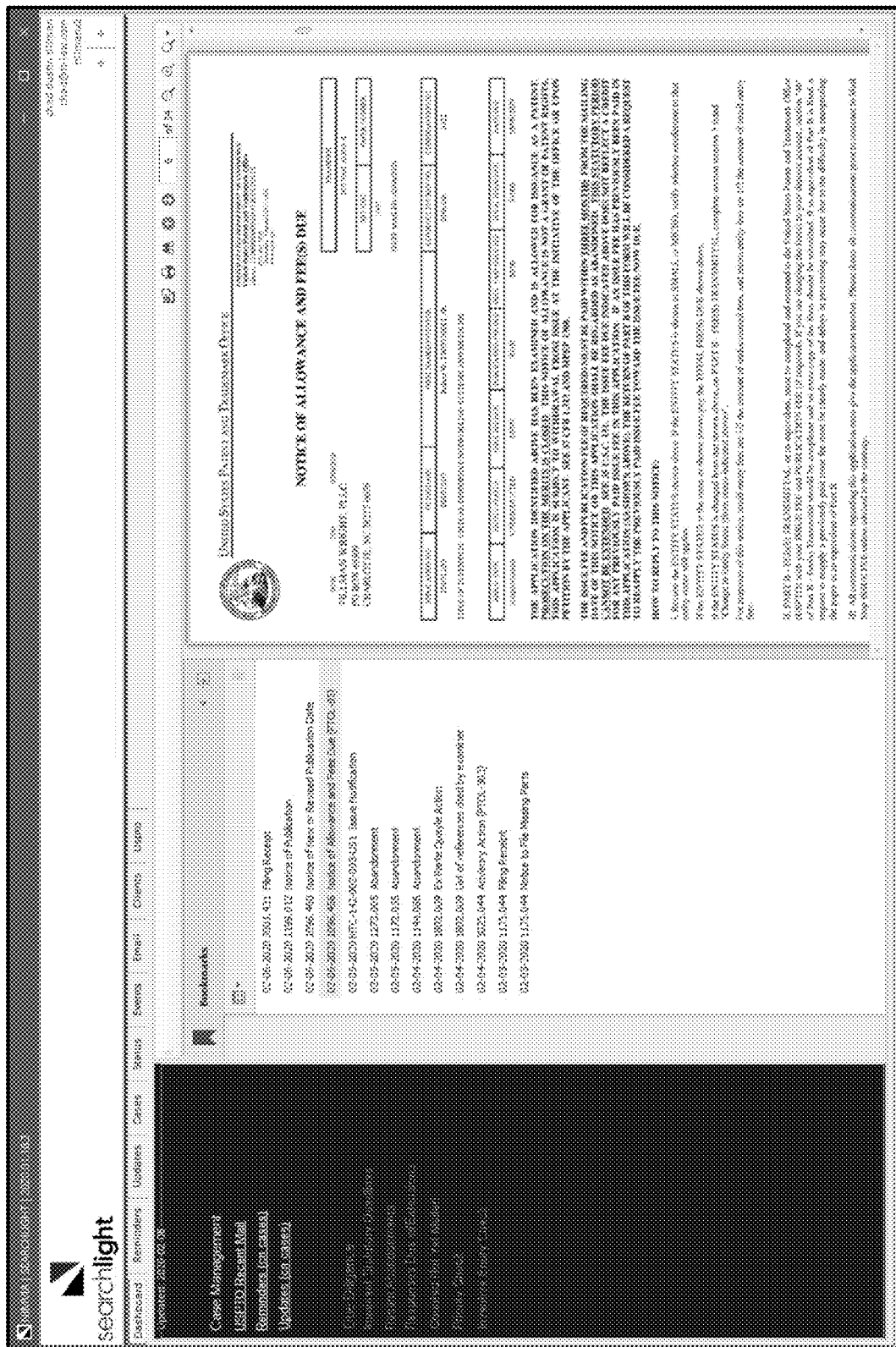
FIG. 14 is a screenshot of a graphical user interface with user controls showing a page of a tab control in accordance with one or more preferred embodiments of the invention, wherein outgoing USPTO correspondence in PDF format for a seven-day look-back period is provided.

Still additional aspects comprise improvements in the user interface as seen in FIGS. 14-25, including functionality and associated layouts of the user controls. In particular, FIG. 14 is a screenshot of a graphical user interface with user controls showing a page of a tab control in accordance with one or more preferred embodiments of the invention. In FIG. 14, the graphical user interface provides a view of a PDF corresponding to outgoing USPTO correspondence for a seven-day look-back period. While a weeks' worth of outgoing correspondence is provided, alternative time frames are possible. Such a PDF is available for download from Private PAIR and is programmatically downloaded and presented to a practitioner through a program including this interface as seen in FIG. 14.

Additionally, the graphical user interface of FIG. 14 functions as a dashboard for the practitioner. Not only is the practitioner able to review the recent outgoing correspondence, but the practitioner is able to select a view a number of reports that are linked in a menu located on the left side of the interface. The reports preferably include: "Due Diligence" which flags issues for investigation by the practitioner, including issues with missing priority claims, lack of overlap in inventorship in applications purportedly related by priority, and nonpublication requests made where foreign filings have been made in the priority lineage (all of which can be programmatically determined from the XML data obtained for the cases); an "Imminent Statutory Deadlines" report which shows deadlines from the reminders tab that are statutory and cannot be extended, that have not yet been marked as completed or reviewed, and that are imminent, e.g., within the next three days; a "Recent Abandonments" report that shows cases abandoned within, e.g., the last seven days, whereby a practitioner can confirm each abandonment was intentional and take immediate action where abandonment was unintentional; a "Responses Due w/Extension" report that shows each case with a response overdue (such as to missing-parts notices and office actions) for which extension fees are accruing should a response eventually be filed; a "Counted Not Yet Mailed" report showing those cases in which an office action or notice of allowance is coming but which has not yet been mailed; a "Priority Check" that reports all cases related by priority directly or indirectly to a selected case; and an "Inventive Entity Check" that reports inventor name discrepancies within a priority family such as, for example, missing suffixes and nicknames compared to full names.

Figure 15:
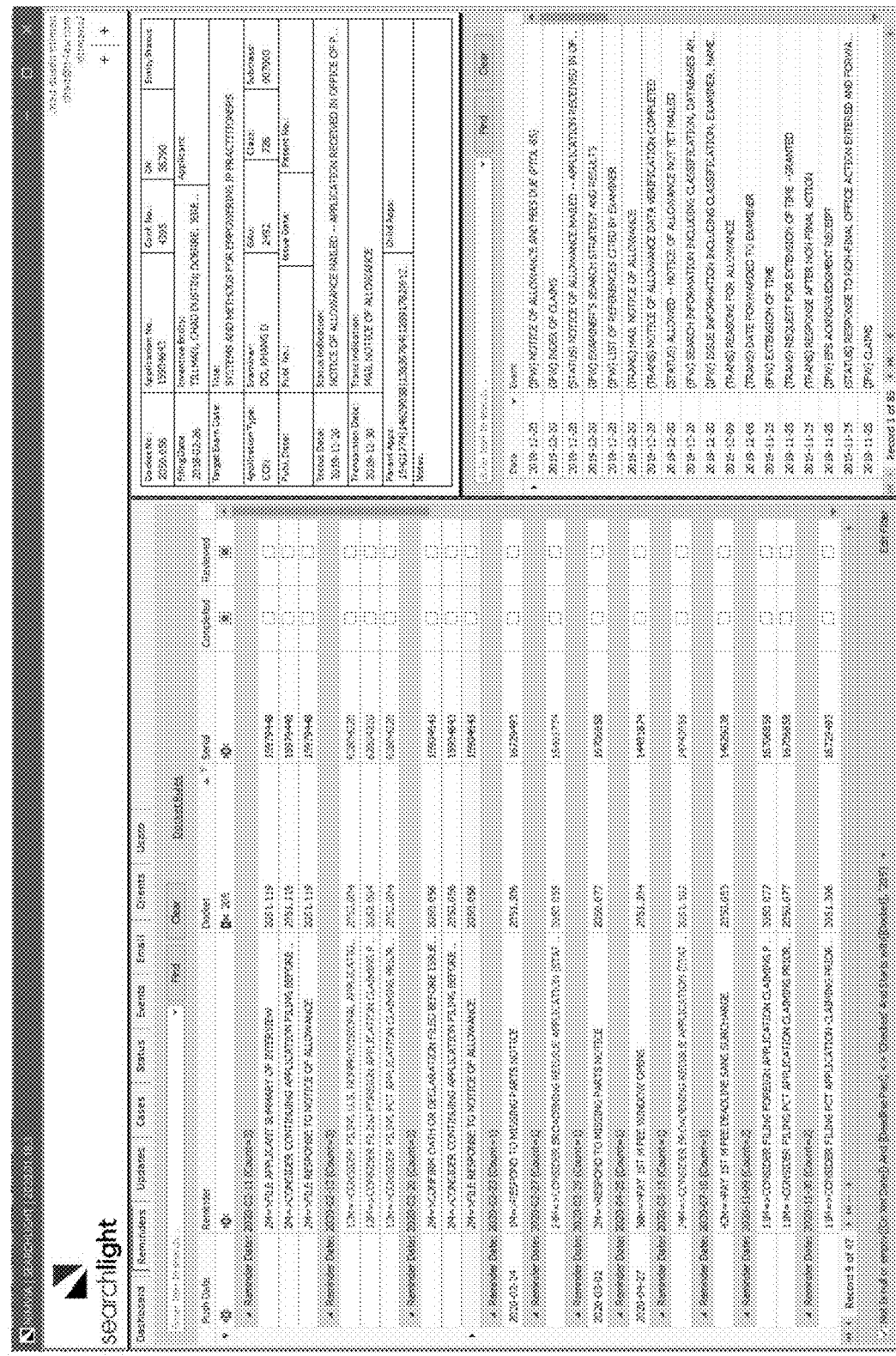
FIG. 15 is a screenshot of a graphical user interface with user controls showing a page of a tab control in accordance with one or more preferred embodiments of the invention, wherein reminders are displayed.

FIG. 15 is a screenshot of another graphical user interface of the "Searchlight" program of FIG. 14, with user controls showing a page of a tab control in accordance with one or more preferred embodiments of the invention, wherein reminders are displayed. The graphical user interface, like those discussed above, includes a matters display area, matter details display area, and events display area.

Figure 16:
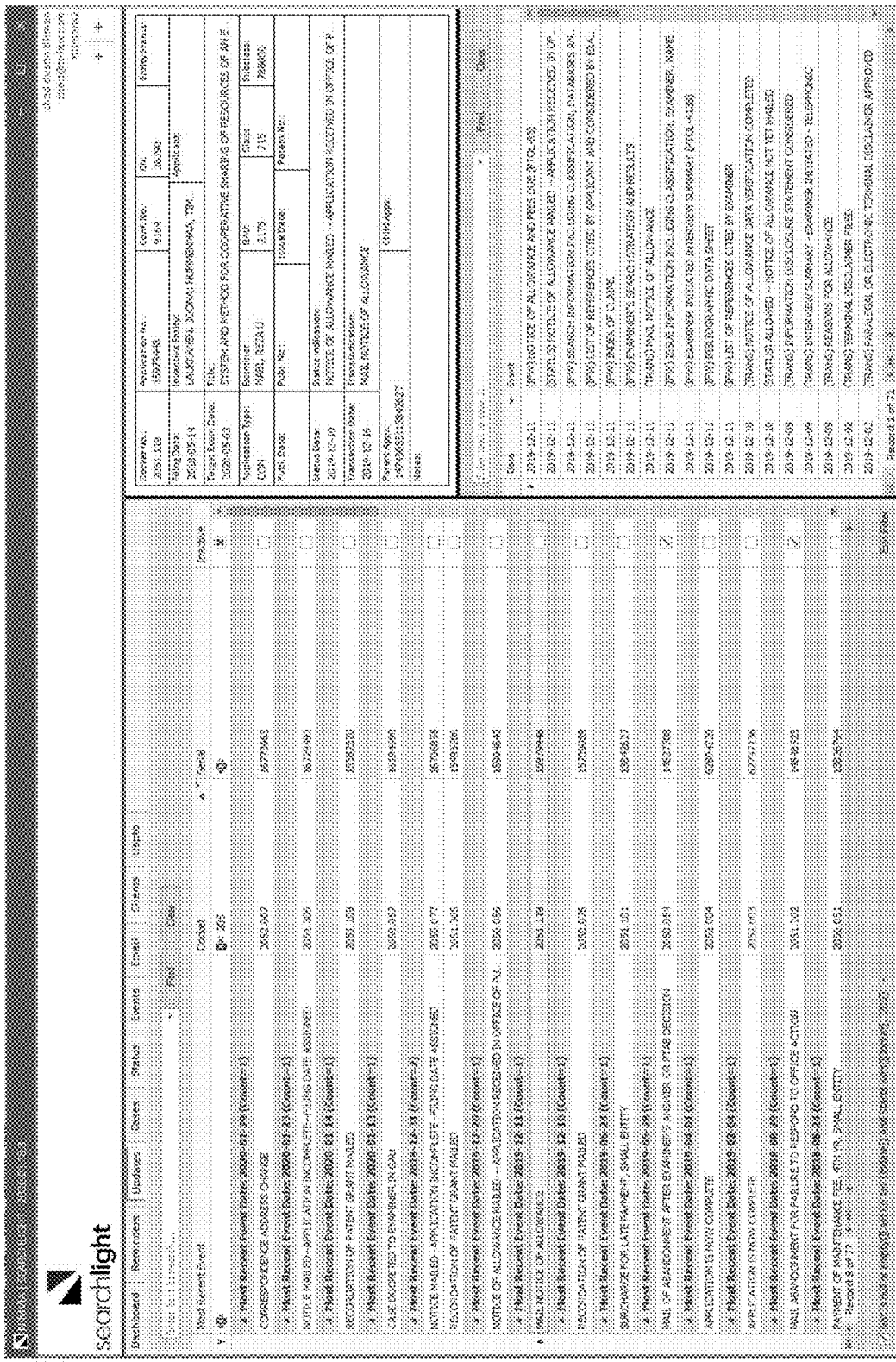
FIG. 16 is a screenshot of a graphical user interface with user controls showing a page of a tab control in accordance with one or more preferred embodiments of the invention, wherein updates are displayed.

FIG. 16 is a screenshot of a graphical user interface of the "Searchlight" program of FIG. 14, with user controls showing a page of a tab control in accordance with one or more preferred embodiments of the invention, wherein updates are displayed. The graphical user interface, like those discussed above, includes a matters display area, matter details display area, and events display area.

Figure 17:
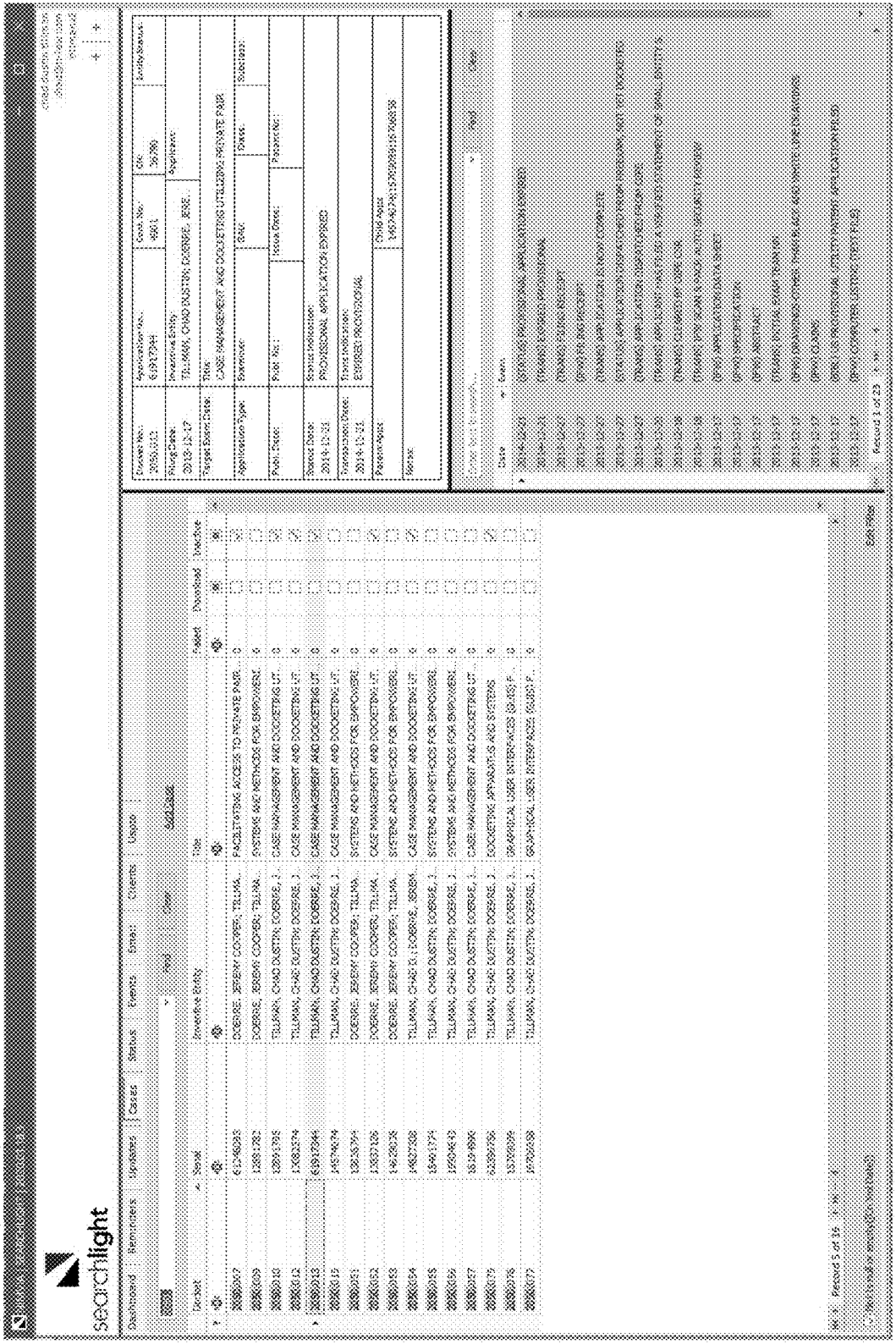
FIG. 17 is a screenshot of a graphical user interface with user controls showing a page of a tab control in accordance with one or more preferred embodiments of the invention, wherein patent applications and *patens* properties (collectively, "cases" or "matters") are displayed.

FIG. 17 is a screenshot of a graphical user interface of the "Searchlight" program of FIG. 14, with user controls showing a page of a tab control in accordance with one or more preferred embodiments of the invention, wherein patent applications and patents properties (collectively, "cases" or "matters") are displayed. The graphical user interface, like those discussed above, includes a matters display area, matter details display area, and events display area.

Figure 18:
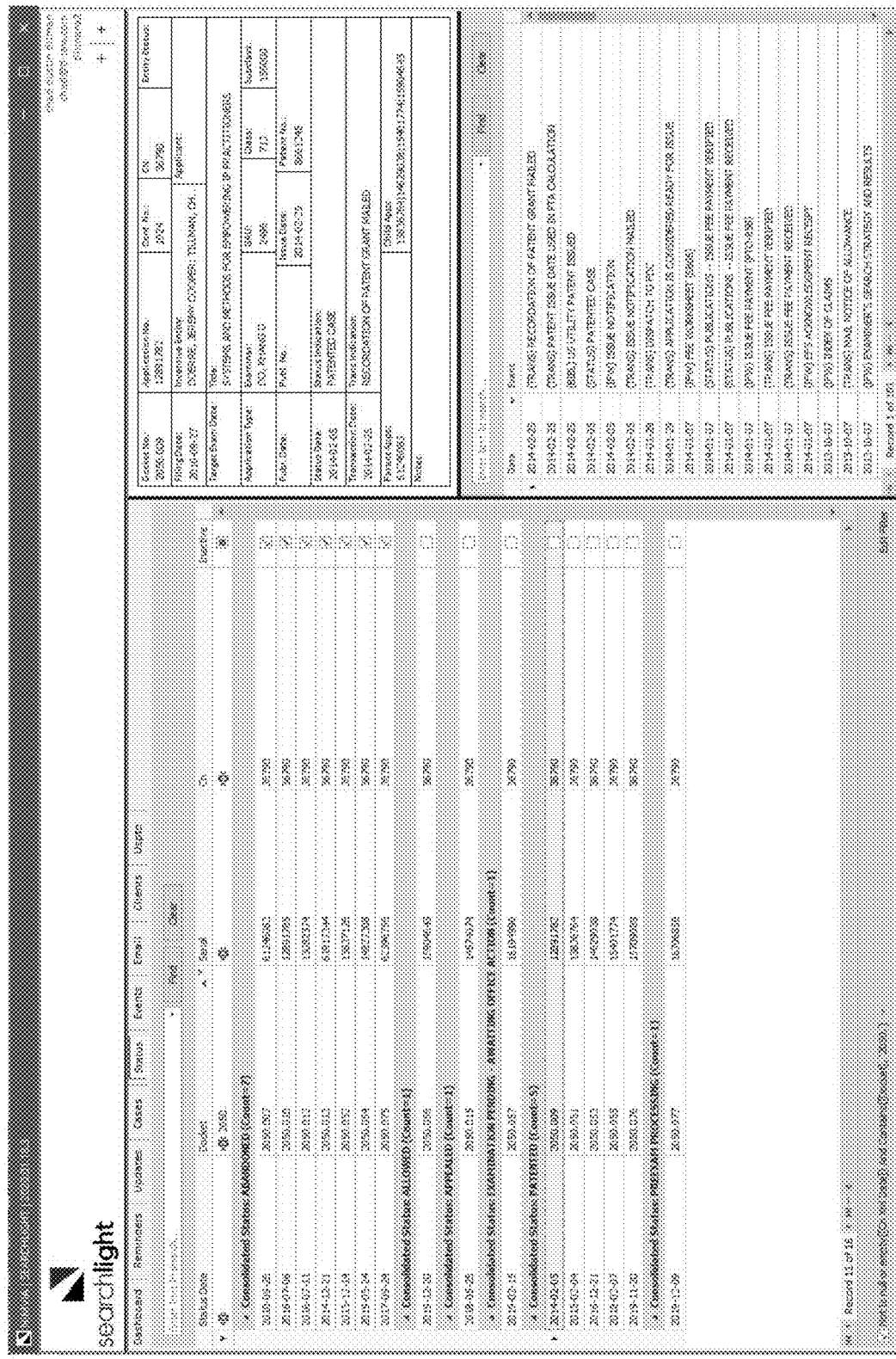
FIG. 18 is a screenshot of a graphical user interface with user controls showing a page of a tab control in accordance with one or more preferred embodiments of the invention, wherein statuses of matters are displayed.

FIG. 18 is a screenshot of a graphical user interface of the "Searchlight" program of FIG. 14, with user controls showing a page of a tab control in accordance with one or more preferred embodiments of the invention, wherein statuses of matters are displayed. The graphical user interface, like those discussed above, includes a matters display area, matter details display area, and events display area.

Figure 19:
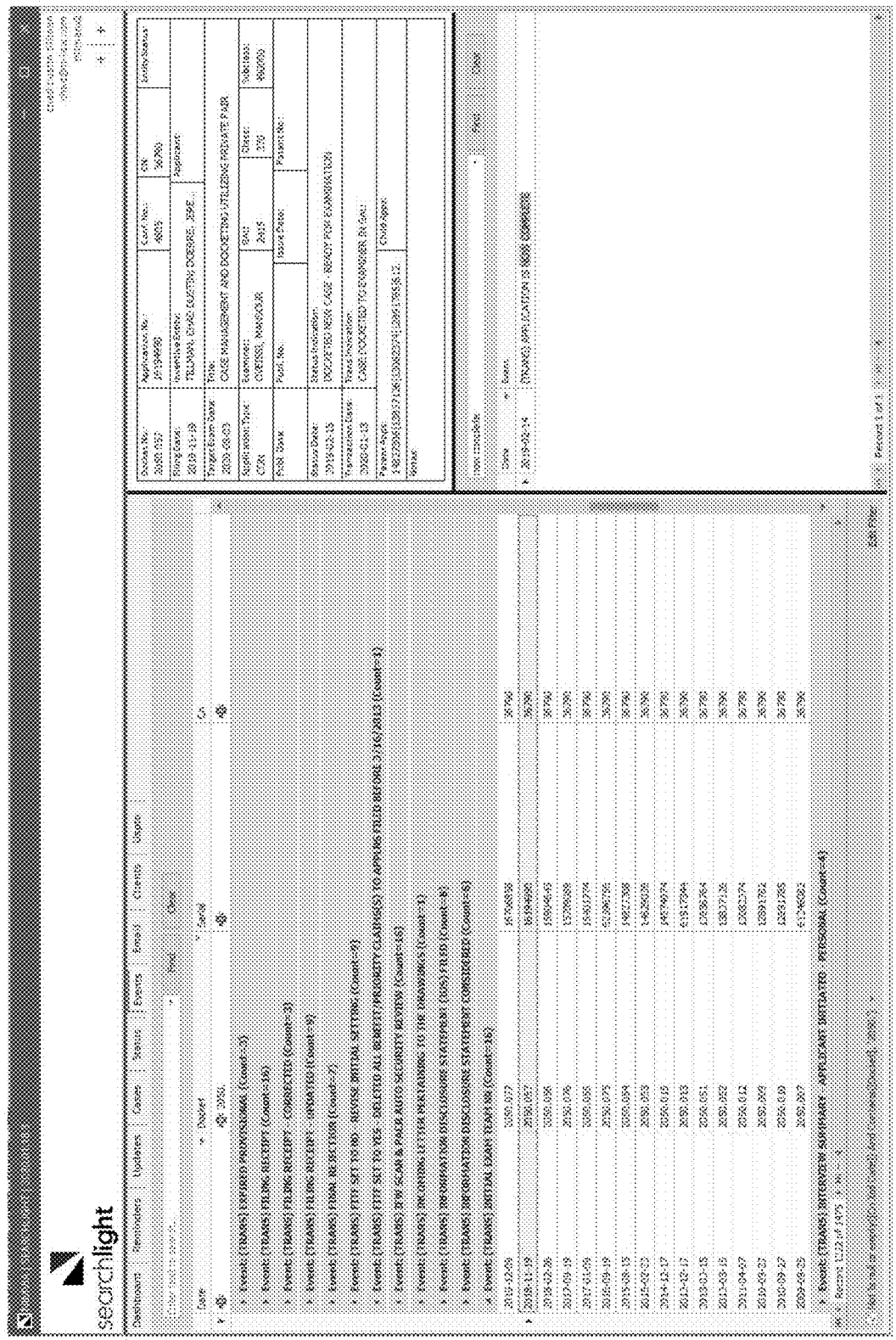
FIG. 19 is a screenshot of a graphical user interface with user controls showing a page of a tab control in accordance with one or more preferred embodiments of the invention, wherein events from matters are collected and displayed.

FIG. 19 is a screenshot of a graphical user interface of the "Searchlight" program of FIG. 14, with user controls showing a page of a tab control in accordance with one or more preferred embodiments of the invention, wherein events from matters are collected and displayed. The graphical user interface, like those discussed above, includes a matters display area, matter details display area, and events display area.

Figure 20:
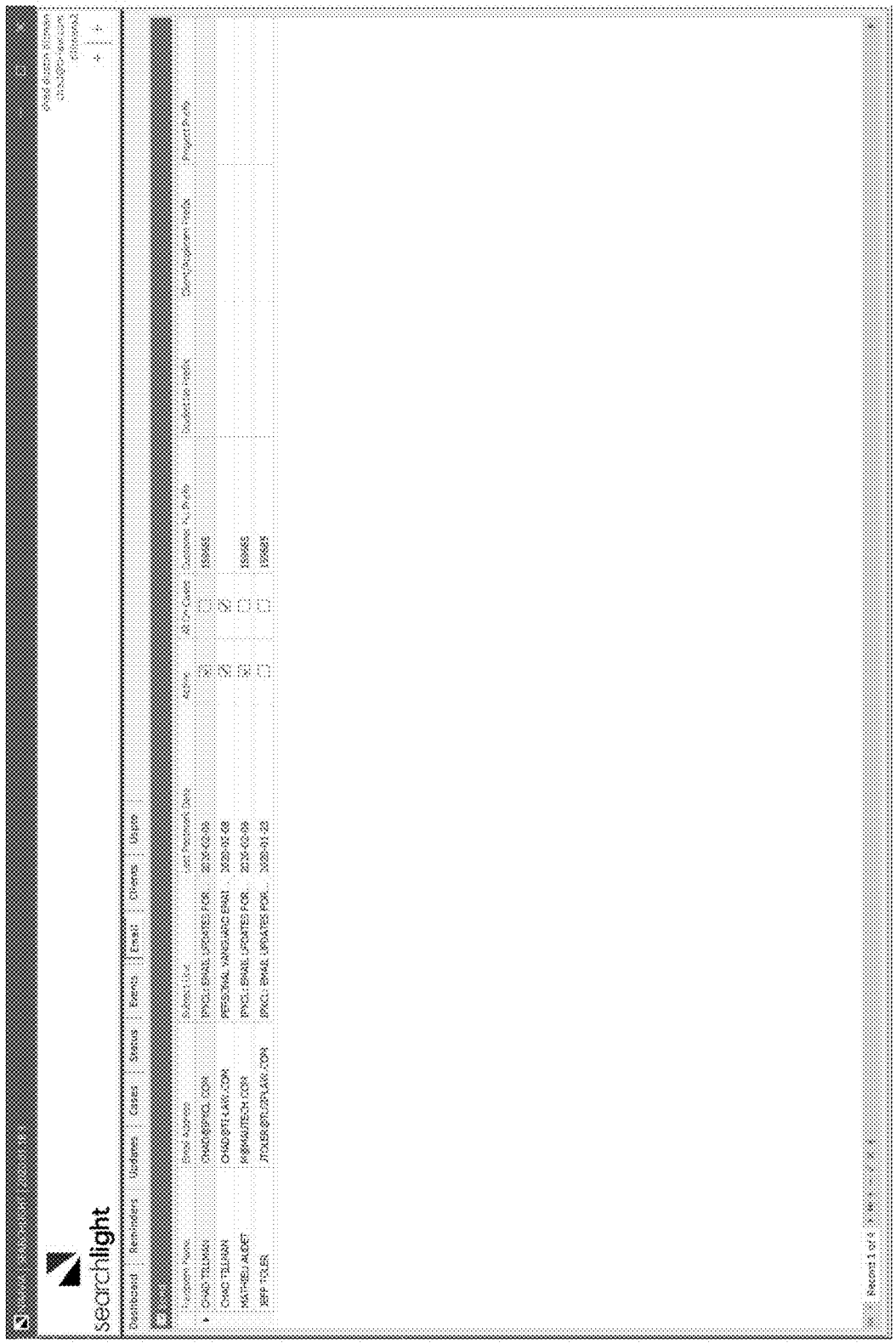
FIG. 20 is a screenshot of a graphical user interface with user controls showing a page of a tab control in accordance with one or more preferred embodiments of the invention, wherein settings can be configured for sending email alerts with an update report and a reminder report.

FIG. 20 is a screenshot of a graphical user interface of the "Searchlight" program of FIG. 14, with user controls showing a page of a tab control in accordance with one or more preferred embodiments of the invention, wherein settings can be configured for sending email alerts with an update report and a reminder report.

Figure 21:
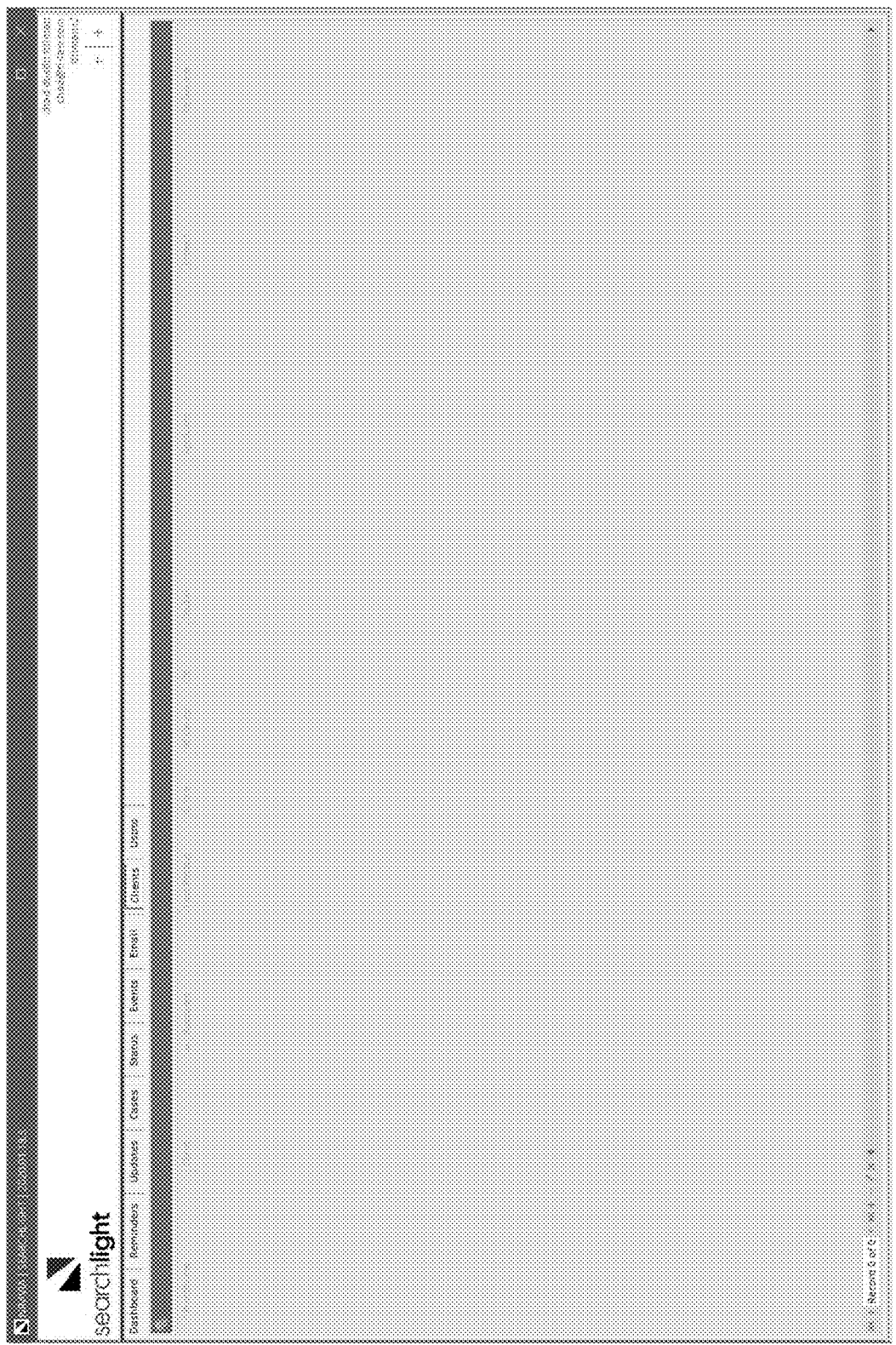
FIG. 21 is a screenshot of a graphical user interface with user controls showing a page of a tab control in accordance with one or more preferred embodiments of the invention, wherein settings can be configured for communicating client data to a remote data repository.

FIG. 21 is a screenshot of a graphical user interface of the "Searchlight" program of FIG. 14, with user controls showing a page of a tab control in accordance with one or more preferred embodiments of the invention, wherein settings can be configured for communicating client data to a remote data repository.

Figure 22:
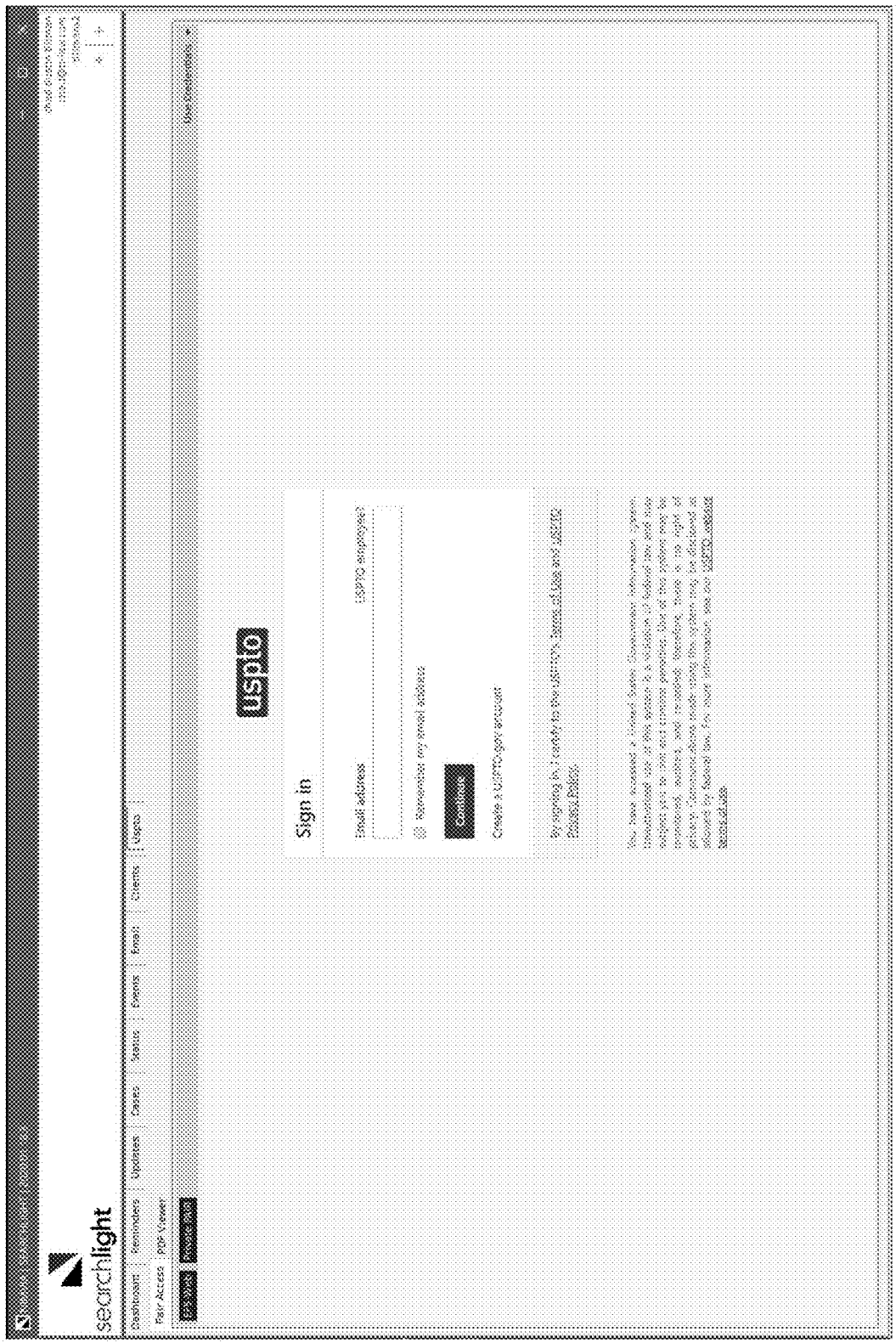
FIG. 22 is a screenshot of a graphical user interface with user controls showing a page of a tab control in accordance with one or more preferred embodiments of the invention, wherein the page comprises a web browser control embedded in the graphical user interface for accessing "MyUspto".

FIG. 22 is a screenshot of a graphical user interface of the "Searchlight" program of FIG. 14, with user controls showing a page of a tab control in accordance with one or more preferred embodiments of the invention, wherein the page comprises a web browser control embedded in the graphical user interface for accessing "MyUspto".

Figure 23:
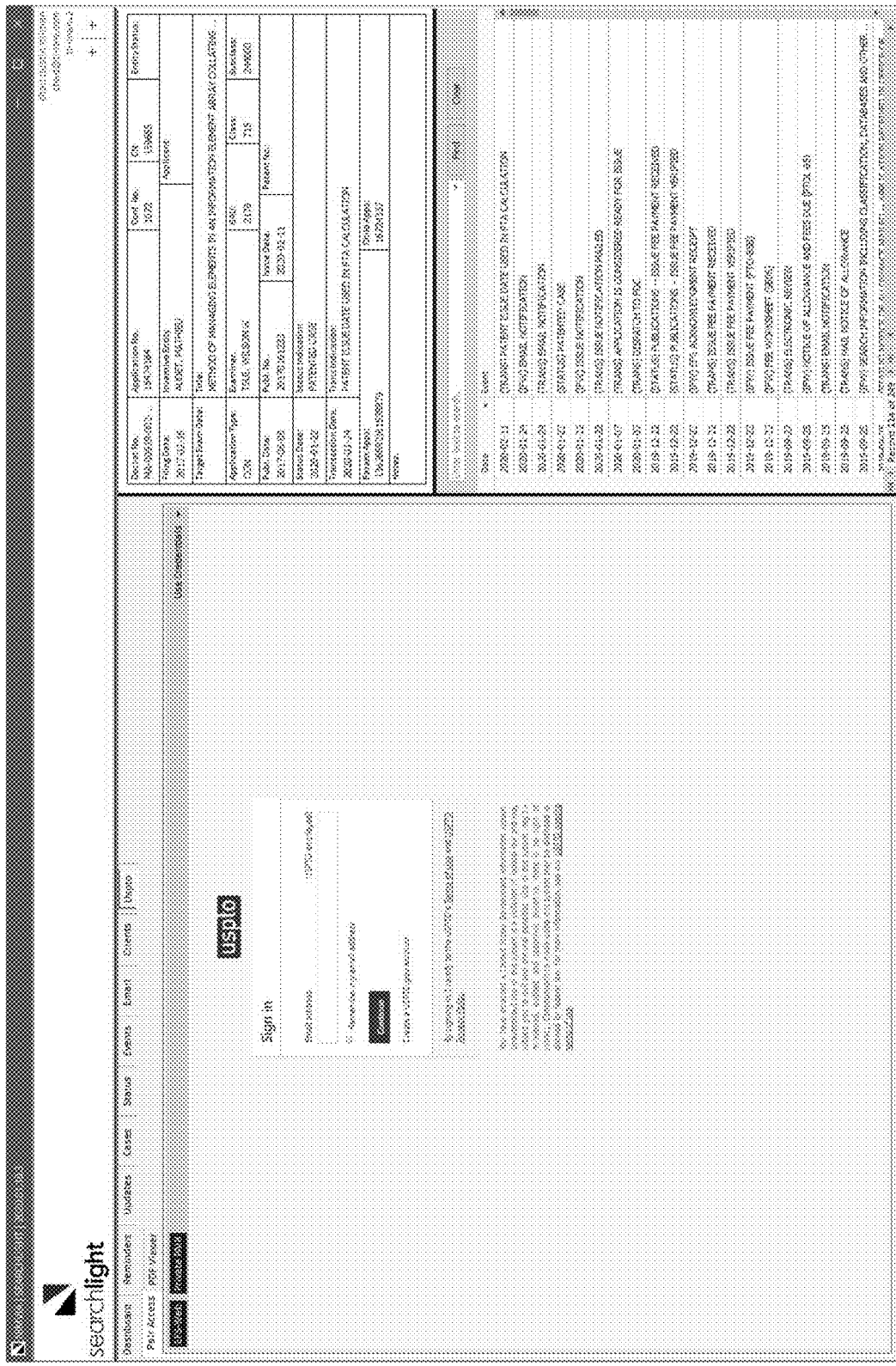
FIGS. 23-25 show additional screenshots of the graphical user interface of FIG. 22, wherein a matter details display area and events display area are displayed at the same time the web browser control is displayed whereby information for a matter can be viewed while manually interacting with the online systems of the USPTO, including EFS-Web for example.
Figure 24:
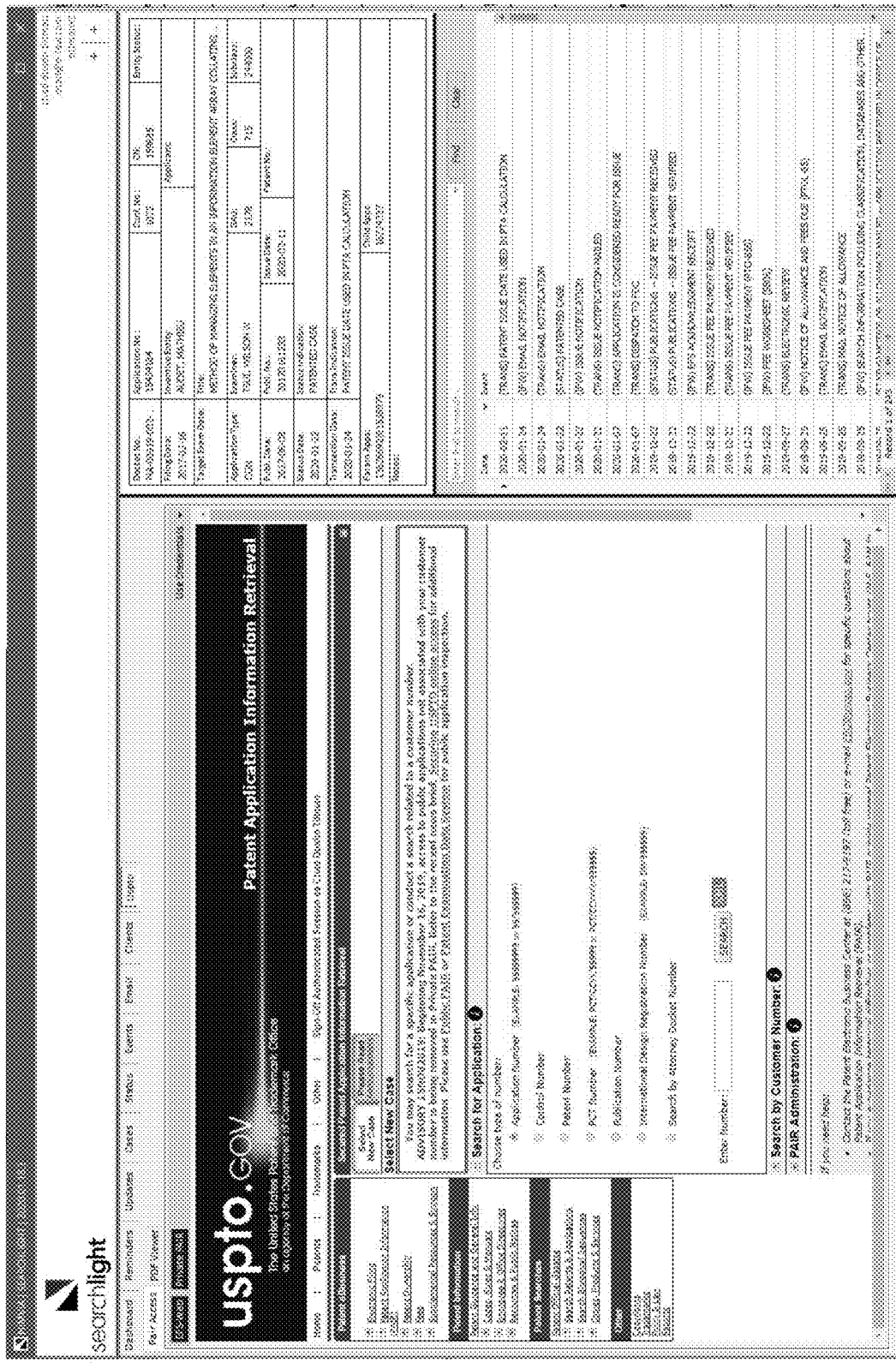
Figure 25:
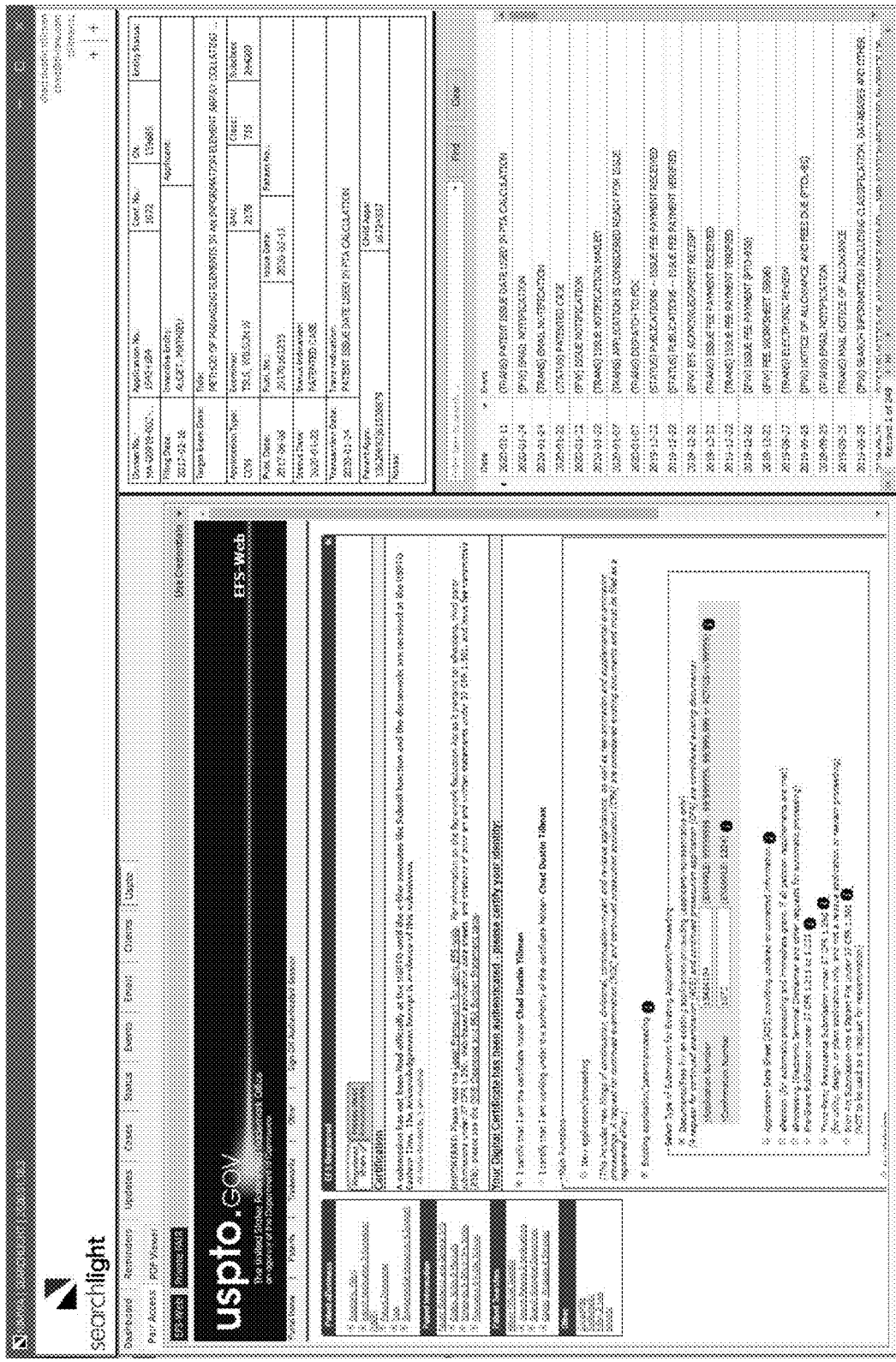

FIGS. 23-25 show additional screenshots of the graphical user interface of FIG. 22, wherein a matter details display area and events display area are displayed at the same time as the web browser control is displayed, whereby information for a matter can be viewed while manually interacting with the online systems of the USPTO, including EFS-Web for example. The facilitates interaction by, for example, enabling copying-and-pasting between the serial number and confirmation number fields of the matter details display area and the input boxes for EFS-Web when filing documents for a matter.

In accordance with one or more preferred implementations, software is provided for automatically downloading XML data from a USPTO web platform, processing such data to produce information regarding patent properties, and presenting produced information to a user via a user interface.

The present application comprises source code submitted herewith as a computer program listing for a distributed system which includes a data engine, an update module, and a user interface.

In accordance with one or more preferred implementations, a data engine is utilized which downloads data from a USPTO web platform. This data engine may optionally perform some processing of this data, e g minimal processing.

In accordance with one or more preferred implementations, an update module accesses data downloaded by the data engine, processes it to produce information regarding patent properties, e.g. a docket, and posts it to a repository, e.g. a cloud repository.

In accordance with one or more preferred implementations, a user interface module accesses produced information from the repository and presents a user interface to a user which presents various views of the information, and optionally allows for user modification and input.

The present application discloses specific innovative aspects and features in code, including specific innovative routines and subroutines that enable performance and enable robustness of a functioning system. These are preferred and are not limiting in terms of claim scope. The present application further discloses innovative methodologies enabling concurrency by those using the "Searchlight" program with a remote data repository, of which program the graphical user interfaces of FIGS. 13-25 are representative.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Thus, for example, the USPTO currently is contemplating moving from Private PAIR to a different interface branded "Patent Center". Nonetheless, the USPTO has stated that XML data will continue to remain available for download, and the invention remains applicable to online systems of the USPTO by which a practitioner's data is accessible for applications and patents regardless of the specific interface and branding thereof that is provided by the USPTO, whether now or in the future.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer-implemented method for presenting a graphical user interface (GUI) at a personal computer providing access to information from an instance of an in-memory docket that is generated on demand by a user without manual data entry of bibliographical or transactional information of patent properties, the method comprising:
(a) programmatically downloading, by the personal computer, from an online computer system of the United States Patent & Trademark Office, data relating to patent properties by
  (i) programmatically accessing over the Internet the online computer system of the United States Patent & Trademark Office, and
  (ii) programmatically downloading to the personal computer one or more XML files containing application data for the patent properties;
(b) programmatically constructing in transitory memory of the personal computer, based on the downloaded data, the in-memory docket for the patent properties; and
(c) programmatically displaying the graphical user interface providing access to information from the instance of an in-memory docket, the graphical user interface comprising
  (i) a matters display area configured to display a row for each patent property representing a matter in the in-memory docket, the in-memory docket including a matter for each patent property of the in-memory docket, wherein a user can click on a row to select it,
  (ii) a matter details display area configured to display details for a matter selected via the matters display area, and
  (iii) an events display area configured to display a plurality of rows each corresponding to an event for a matter selected via the matter display area, and
  (iv) further comprising a display area containing outgoing correspondence of the United States Patent & Trademark Office in PDF format for review by a user.

2. The method of claim 1, wherein the events configured to be displayed in the events display area include events based on transaction information for a patent property.

3. The method of claim 1, wherein the events configured to be displayed in the events display area include events based on status information for a patent property.

4. The method of claim 1, wherein the events configured to be displayed in the events display area include events based on mail information for a patent property.

5. The method of claim 1, wherein the events configured to be displayed in the events display area include events based on image file wrapper information for a patent property.

6. The method of claim 1, wherein the events display area comprises a search box configured search for events matching a search query.

7. The method of claim 1, wherein the events display area comprises a filter row configured to filter the events displayed in the events display area.

8. The method of claim 1, wherein the graphical user interface further comprises a search box configured to allow a user to search for matters matching a search query.

9. The method of claim 1, wherein the matters display area further comprises a filter row configured to filter the matters displayed in the matters display area.

10. The method of claim 1, wherein the matters display area is scrollable.

11. The method of claim 1, wherein the events display area is scrollable.

12. The method of claim 1, wherein the matters display area is displayed on a left side of the graphical user interface.

13. The method of claim 1, wherein the matters display area is displayed on a left side of a page of the graphical user interface, and the matter details display area and the events display area are displayed on a right side of the same page of the graphical user interface; and wherein the outgoing correspondence of the United States Patent & Trademark Office in PDF format is displayed on a separate page of the graphical user interface.

14. The method of claim 1, wherein the matters display area is displayed on a left side of a page of the graphical user interface, the matter details display area and the events display area are displayed on a right side of the page of the graphical user interface, and the matter details display area is displayed above the events display area.

15. A computer-implemented method for presenting a graphical user interface (GUI) at a personal computer providing access to information from an instance of an in-memory docket that is generated on demand by a user without manual data entry of bibliographical or transactional information of patent properties, the method comprising:
(a) programmatically downloading, by the personal computer, from an online computer system of the United States Patent & Trademark Office, data relating to patent properties by
  (i) programmatically accessing over the Internet the online computer system of the United States Patent & Trademark Office, and
  (ii) programmatically downloading to the personal computer one or more XML files containing application data for the patent properties;
(b) programmatically constructing in transitory memory of the personal computer, based on the downloaded data, the in-memory docket for the patent properties; and
(c) programmatically displaying the graphical user interface providing access to information from the instance of an in-memory docket, the graphical user interface comprising
  (i) a matters display area configured to display a row for each patent property representing a matter in the in-memory docket, the in-memory docket including a matter for each patent property of the in-memory docket, wherein a user can click on a row to select it,
  (ii) a matter details display area configured to display details for a matter selected via the matters display area, and
  (iii) an events display area configured to display a plurality of rows each corresponding to an event for a matter selected via the matter display area.

16. The method of claim 15, wherein the events display area comprises a search box configured search for events matching a search query.

17. The method of claim 15, wherein the events display area comprises a filter row configured to filter the events displayed in the events display area.

18. The method of claim 15, wherein the graphical user interface further comprises a search box configured to allow a user to search for matters matching a search query.

19. The method of claim 15, wherein the matters display area further comprises a filter row configured to filter the matters displayed in the matters display area.

20. A non-transitory computer-readable medium containing computer-executable instructions that, when executed by a computer, perform the method of claim 15.

* * * * *